United States Patent
Kim et al.

(10) Patent No.: US 11,256,846 B2
(45) Date of Patent: Feb. 22, 2022

(54) SYSTEM AND METHOD OF ANALYZING INTEGRATED CIRCUIT IN CONSIDERATION OF A PROCESS VARIATION AND A SHIFT

(71) Applicant: SAMSUNG ELECTRONICS CO., LTD., Suwon-si (KR)

(72) Inventors: Moon-Su Kim, Gimpo-si (KR); Naya Ha, Seoul (KR); Jong-Ku Kang, Suwon-si (KR); Andrew Paul Hoover, Austin, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 256 days.

(21) Appl. No.: 16/404,910

(22) Filed: May 7, 2019

(65) Prior Publication Data
US 2019/0258775 A1    Aug. 22, 2019

Related U.S. Application Data

(63) Continuation-in-part of application No. 15/081,291, filed on Mar. 25, 2016, now Pat. No. 10,372,869.
(Continued)

(30) Foreign Application Priority Data

Aug. 31, 2015    (KR) .................. 10-2015-0123198

(51) Int. Cl.
*G06F 30/398*    (2020.01)
*G06F 30/327*    (2020.01)
*G06F 119/12*    (2020.01)

(52) U.S. Cl.
CPC .......... *G06F 30/398* (2020.01); *G06F 30/327* (2020.01); *G06F 2119/12* (2020.01)

(58) Field of Classification Search
CPC ... G06F 30/327; G06F 30/398; G06F 2119/12
See application file for complete search history.

(56) References Cited

U.S. PATENT DOCUMENTS

| 6,018,623 A | 1/2000 | Chang et al. |
|---|---|---|
| 7,555,740 B2 | 6/2009 | Buck et al. |

(Continued)

FOREIGN PATENT DOCUMENTS

| JP | 2006-338253 | 12/2006 |
|---|---|---|
| JP | 2008-218666 | 9/2008 |

(Continued)

OTHER PUBLICATIONS

Chan, Tuck-Boon, Sorin Dobre, and Andrew Kahng, "Improved signoff methodology with tightened BEOL corners" 2014 32nd IEEE International Conference on Computer Design (ICCD), pp. 311-316, IEEE, 2014.
(Continued)

*Primary Examiner* — Jack Chiang
*Assistant Examiner* — Aric Lin
(74) *Attorney, Agent, or Firm* — F. Chau & Associates, LLC

(57) ABSTRACT

A computer implemented method for analyzing a timing of an integrated circuit, wherein an interconnection of a first net of the integrated circuit includes at least one conducting segment formed in a wiring layer or a via layer, includes obtaining a plurality of resistances and a plurality of capacitances, which correspond to each of the at least one conducting segment, based on a process variation, counting a number of layers in which the at least one conducting segments is formed, and calculating a corner resistance and a corner capacitance of the first net, based on the number of layers, the plurality of resistances, and the plurality of capacitances, wherein the counting of the number of layers
(Continued)

includes calculating an effective number of layers based on a resistance variability and/or a capacitance variability of each of the layers.

20 Claims, 17 Drawing Sheets

Related U.S. Application Data

(60) Provisional application No. 62/139,103, filed on Mar. 27, 2015.

(56) References Cited

U.S. PATENT DOCUMENTS

| | | |
|---|---|---|
| 7,984,406 B2 | 7/2011 | Akamine et al. |
| 8,204,714 B2 | 6/2012 | Lu |
| 8,239,795 B2 | 8/2012 | Ono |
| 8,589,852 B1 | 11/2013 | Liu et al. |
| 8,615,727 B2 | 12/2013 | Ghanta et al. |
| 2002/0077798 A1 | 6/2002 | Inoue et al. |
| 2008/0221849 A1 | 9/2008 | Angyal et al. |
| 2009/0313593 A1 | 12/2009 | Ushiyama |
| 2011/0061037 A1 | 3/2011 | Croysdale et al. |
| 2014/0258962 A1 | 9/2014 | Ho et al. |
| 2016/0283643 A1 | 9/2016 | Kim et al. |

FOREIGN PATENT DOCUMENTS

| | | |
|---|---|---|
| JP | 2009-026036 | 2/2009 |
| JP | 2013-109498 | 6/2013 |
| KR | 10-2008-0000709 | 1/2008 |
| KR | 10-2009-0116726 | 11/2009 |

OTHER PUBLICATIONS

Notice of Allowance dated Sep. 27, 2021 in corresponding Korean Patent Application No. 10-2015-0123198, in Korean, 6 pages.

```
                                                                100'
# late via table for reference via
Num_via:        1      2     3     ...   100   ...
Variation       0.5    0.4   0.3   ...   0.01  ...

# early via table for reference via
Num_via:        1      2     3     ...   100   ...
Variation       0.35   0.3   0.25  ...   0.01  ...

# weight
W(V1)    1      #reference via
W(V2)    1.2
```

SYSTEM AND METHOD OF ANALYZING INTEGRATED CIRCUIT IN CONSIDERATION OF A PROCESS VARIATION AND A SHIFT

CROSS-REFERENCE TO RELATED APPLICATIONS

This application claims priority under 35 U.S.C. § 120 to U.S. Patent Application No. 62/139,103, filed on Mar. 27, 2015, in the United States Patent and Trademark Office, and under 35 U.S.C. § 119 to Korean Patent Application No. 10-2015-0123198, filed on Aug. 31, 2015, in the Korean Intellectual Property Office, the disclosures of which are incorporated by reference herein in their entireties.

TECHNICAL FIELD

The inventive concept relates to a system and a method of analyzing an integrated circuit, and more particularly, to a system and a method of analyzing an integrated circuit in consideration of a process variation and a shift.

DISCUSSION OF THE RELATED ART

Semiconductor manufacturing process technologies, enable the manufacture of semiconductor devices that include a large number transistors that operate at high speeds. Accordingly, when designing an integrated circuit for a semiconductor device, methods are employed to analyze the circuit's timing.

A delay time of a signal generated in an interconnection of the integrated circuit may be calculated when analyzing a timing of the integrated circuit. A physical structure of the interconnection may vary depending on the manufacturing process of the semiconductor device. Thus, a process variation and a shift may be taken into account when calculating a delay time of a signal generated in the interconnection.

SUMMARY

According to an exemplary embodiment of the inventive concept, a computer implemented method for analyzing a timing of an integrated circuit, wherein an interconnection of a first net of the integrated circuit includes at least one conducting segment formed in a wiring layer or a via layer, includes obtaining a plurality of resistances and a plurality of capacitances, which correspond to each of the at least one conducting segment, based on a process variation, counting a number of layers in which the at least one conducting segments is formed, and calculating a corner resistance and a corner capacitance of the first net, based on the number of layers, the plurality of resistances, and the plurality of capacitances, wherein the counting of the number of layers includes calculating an effective number of layers based on a resistance variability and/or a capacitance variability of each of the layers.

According to an exemplary embodiment of the inventive concept, a computer implemented method for analyzing a timing of an integrated circuit, wherein an interconnection of a first net of the integrated circuit includes at least one conducting segment formed in a wiring layer or a via layer, includes obtaining a technology file and design data of the integrated circuit, extracting a plurality of resistances and a plurality of capacitances, which correspond to the first net, from the technology file and the design data, based on a process variation, counting a number of layers in which the at least one conducting segments is formed, based on the design data, calculating a corner resistance and a corner capacitance of the first net, based on the number of layers, the plurality of resistances, and the plurality of capacitances, and calculating a delay time of the first net based on the corner resistance and the corner capacitance, wherein the counting of the number of layers includes calculating an effective number of layers based on a resistance variability and/or a capacitance variability of each of the layers.

BRIEF DESCRIPTION OF THE DRAWINGS

The above and other features of the inventive concept will become more clearly understood by describing in detail exemplary embodiments thereof with reference to the accompanying drawings, in which.

DETAILED DESCRIPTION OF THE EMBODIMENTS

Figure 1:
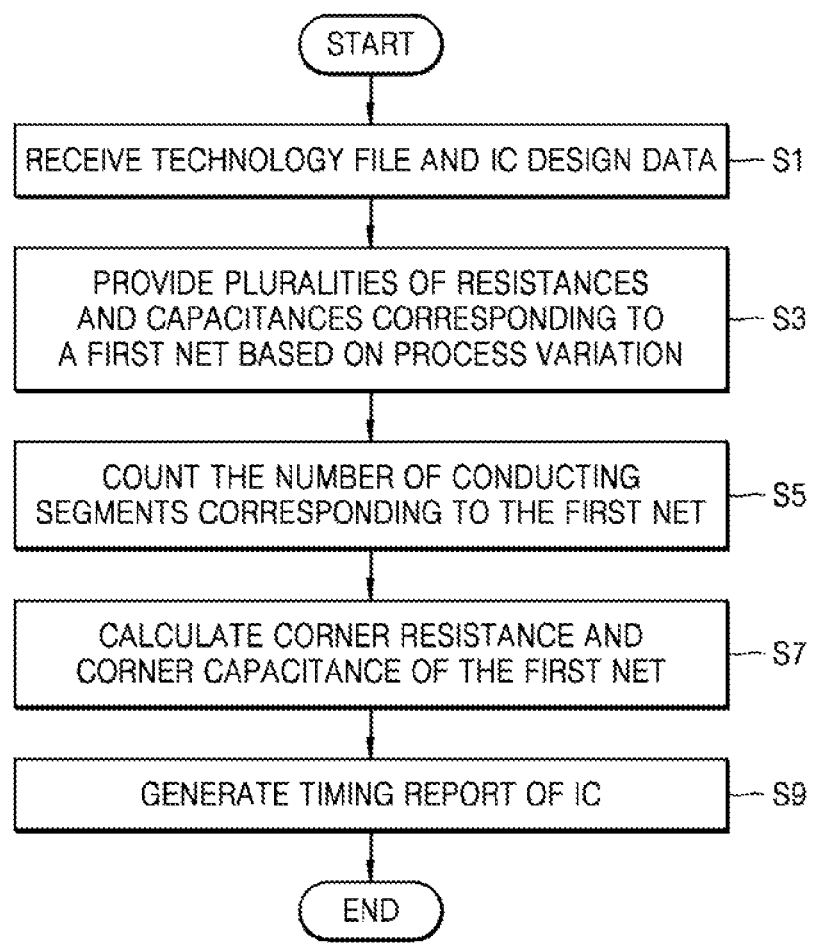
FIG. 1 is a flowchart illustrating a method of analyzing an integrated circuit, according to an exemplary embodiment of the inventive concept.

Exemplary embodiments of the inventive concept will now be described more fully hereinafter with reference to the accompanying drawings. It should be understood, however, that the inventive concept may be embodied in different forms and should not be construed as limited to the embodiments set forth herein. Like reference numerals refer to like elements throughout the specification. In the drawings, the thicknesses of layers and regions may be exaggerated for clarity.

An integrated circuit or a layout of an integrated circuit may include a structure in which a plurality of layers are stacked, and may include a plurality of patterns formed in each of the plurality of layers. Wiring layers of the plurality of layers may include a conductive material and provide a path through which an electrical signal passes. Patterns formed in wiring layers at different levels may be electrically connected to each other through vias including a conductive material. One net having an equal potential in an equivalent circuit diagram of an integrated circuit may correspond to one interconnection in a layout of the integrated circuit, and the one interconnection may include patterns formed in a wiring layer and/or vias electrically connected to each other. A pattern formed in a wiring layer or a via which forms one interconnection may be referred to as a conducting segment. In other words, one interconnection may include at least one conducting segment. A delay time of a signal which occurs in an interconnection may be calculated based on a resistance-capacitance (RC) delay that is caused due to parasitic resistance and parasitic capacitance in a conducting segment included in the interconnection.

A method of analyzing timing of an integrated circuit, according to an exemplary embodiment of the inventive concept, may accurately analyze, in a relatively short time, a delay time of a signal, which occurs in an interconnection, by statistically reflecting a process variation based on the number of layers in which conducting segments included in one interconnection (or net) are formed. Hereinafter, one net may be referred to as one interconnection in a layout of an integrated circuit. In addition, a wiring layer may be referred to as a metal layer including a metal as a conductive material. In other words, one net may be one interconnection and includes patterns formed in a wiring layer and/or vias connected to the wiring layer. The patterns and vias may be conducting (e.g., conductive) segments of the net. However, according to exemplary embodiments of the inventive concept, wiring layers may include a conductive material other than metal.

FIG. 1 is a flowchart illustrating a method of analyzing an integrated circuit, according to an exemplary embodiment of the inventive concept.

In operation S1, an operation of receiving a technology file and design data of the integrated circuit may be performed. The technology file may include information about a process by which a semiconductor device including the integrated circuit is manufactured. For example, the technology file may include a unit resistance and a unit capacitance of each wiring layer of a particular net, and may also include a unit resistance of a via formed in each via layer. In addition, as described below with reference to FIGS. 2 and 3, the technology file may include information (for example, a standard deviation σ) related to the distribution of the unit resistance and the distribution of the unit capacitance of each wiring layer according to a process variation.

The design data of the integrated circuit may include information about the integrated circuit. For example, the design data of the integrated circuit may include topological data about a layout of the integrated circuit, and may also include a netlist indicating elements (e.g., conductive segments) included in the integrated circuit and the electrical connection relation of the elements. If it is determined, by a method according to an exemplary embodiment of the inventive concept, that an integrated circuit defined by design data of the integrated circuit has a weak (e.g., poor) timing performance, a designer may change the design data of the integrated circuit by performing a synthesis or place and routing (P&R) again. Next, the designer may analyze the integrated circuit again with the changed design data of the integrated circuit by using the method according to the exemplary embodiment of the inventive concept described with reference to FIG. 1.

Unit resistances and unit capacitances, included in the technology file, may be used for calculating a delay time of a signal which occurs in an interconnection of the integrated circuit. In other words, a delay time of a signal which occurs in an interconnection of the integrated circuit may be calculated by applying unit resistances and unit capacitances, included in the technology file, to the integrated circuit. This may be done based on physical information of an interconnection included in the design data of the integrated circuit. The physical information of an interconnection included in design data of the integrated circuit may include, for example, a level of a wiring layer in which patterns included in the interconnection are disposed, a width and a length of each pattern, and a level having vias disposed therein.

In operation S3, an operation of providing a plurality of resistances and a plurality of capacitances, which correspond to a first net, based on a process variation may be performed. In order to design an integrated circuit while taking into account a process variation, it may be assumed that elements of the integrated circuit are in a state deviated from a nominal state, and the integrated circuit including the elements in the state deviated from the nominal state may be analyzed. The deviated state of the elements of the integrated circuit may mean that the conductive elements of the integrated circuit have increased or decreased resistance and/or capacitance with respect to their nominal state. For example, based on a variation of a process by which a semiconductor device including an integrated circuit is manufactured, the variation may be applied to unit resistances and unit capacitances, and a worst case or a best case may be derived according to a direction in which the variation is reflected. For example, variation of elements applied in a first direction may mean that the elements have increased capacitance and/or resistance with respect to their nominal resistance and/or capacitance, and variation of elements applied in a second direction opposite to the first direction may mean that the elements have decreased capacitance and/or resistance with respect to their nominal resistance and/or capacitance. In this case, the direction in which the variation is reflected may be referred to as a direction in which characteristic values (e.g., capacitance and/or resistance) of the elements of the integrated circuit increase or decrease so as to strengthen or weaken any characteristic of the integrated circuit. In this manner, a state of an integrated circuit including elements in which variation has been reflected in a predetermined direction may be referred to as a corner case. A characteristic value, such as resistance or capacitance, which an element has in the corner case may be referred to as a corner value. For example, a corner resistance of a first net may include conducting elements of the first net having resistances which account for a process variation. For example, a corner capacitance of the first net may include conducting elements of the first net having capacitances which account for a process variation. As an integrated circuit is analyzed in the corner case, an integrated circuit that is robust and has a reduced performance margin may be designed based on the analysis result of the corner case.

According to an exemplary embodiment of the inventive concept, a plurality of resistances and a plurality of capacitances may be provided to each conducting segment included in an interconnection of an integrated circuit. Each of the plurality of resistances and each of the plurality of capacitances may correspond to a mean value (or nominal value) of a probability distribution and a multiple of standard deviation for the conductive segments depending on the process variation, as described above. The plurality of resistances and the plurality of capacitances are described in detail below with reference to FIG. 7.

In operation S5, an operation of counting the number of conducting segments corresponding to the first net may be performed. As described above, one net or one interconnection of an integrated circuit may include at least one conducting segment. The number of conducting segments may include the number of layers (i.e., wiring layers and via layers) forming the first net (or an interconnection corresponding to the first net). In addition, the number of conducting segments may be derived from the number of layers.

As described below, one interconnection may include conducting segments between which a correlation is weak. The weak correlation may be due to, for example, the different processes used to manufacture the metal layers or vias. For example, different processes may have different manufacturing tolerances. Analyzing a corner case by applying variations in the same direction to all characteristic values of the conducting segments may cause a pessimistic or optimistic analysis of an integrated circuit, and may not reflect an actual state of the integrated circuit. The method according to the current exemplary embodiment may enable a more realistic analysis of the actual state of the integrated circuit by avoiding a pessimistic or optimistic analysis based on the number of conducting segments of an interconnection. The number of conducting segments will be described later with reference to FIGS. 9 to 11 and FIGS. 14 to 17.

In operation S7, an operation of calculating a corner resistance and a corner capacitance of the first net may be performed. As described above, a corner value, such as the corner resistance and the corner capacitance, may be referred to as a characteristic value which an element (for example, a pattern formed in a wiring layer or a via) of an integrated circuit has when the integrated circuit is in a corner state. The corner resistance and the corner capacitance of the first net may be calculated based on the number of conducting segments of the first net, the plurality of resistances, and the plurality of capacitances of the conducting segments of the first net. Since the corner resistance and the corner capacitance of the first net is calculated based on the number of conducting segments in operation S7, a corner case of an actual integrated circuit may be provided.

In operation S9, an operation of generating a timing report of the integrated circuit may be performed. The timing report may include information about delay times of signals generated by elements of the integrated circuit, and a designer may determine a timing performance of the integrated circuit from the timing report.

Figure 2:
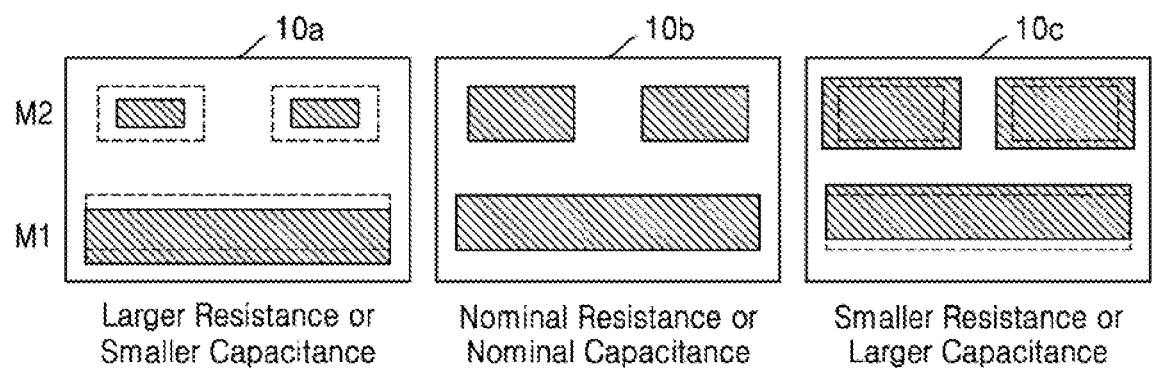
FIG. 2 is a diagram illustrating cross-sections of patterns formed differently due to a process variation according to an exemplary embodiment of the inventive concept.

FIG. 2 is a diagram illustrating cross-sections of patterns formed differently due to a process variation according to an exemplary embodiment of the inventive concept. For example, FIG. 2 shows cross-sections obtained by cutting patterns, formed in a first metal layer M1 and a second metal layer M2, parallel to a stack direction of an integrated circuit. In FIG. 2, dashed lines indicate sizes and positions of patterns in an integrated circuit 10b illustrated in the center of FIG. 2. In some cases, the metal layers may be denoted as "ML" in the drawings.

In the integrated circuit 10b illustrated in the center of FIG. 2, each pattern of the second metal layer M2 may have a nominal resistance and a nominal capacitance. In other words, as patterns of the first and second metal layers M1 and M2 are formed in sizes required by a designer without being influenced by a process variation, each of the patterns of the second metal layer M2 may have a nominal resistance and a nominal capacitance. Even if it is intended to form patterns like the integrated circuit 10b, the patterns may be formed like an integrated circuit 10a illustrated on a left side of FIG. 2 or an integrated circuit 10c illustrated on a right side of FIG. 2, due to a process variation.

A resistance of a pattern may be inversely proportional to the width (e.g., a length in a direction that is perpendicular to a stack direction and is perpendicular to a moving direction of a signal) of the pattern and the height (e.g., a length in a direction that is parallel to the stack direction) of the pattern. In other words, as a cross-section area of a pattern decreases, a resistance of the pattern may increase. As a distance between a pattern and an adjacent pattern decreases, a capacitance of the pattern may increase. In addition, as a surface area of the pattern is larger than that of the adjacent pattern, the capacitance of the pattern may increase. Accordingly, in the integrated circuit 10a illustrated on the left side of FIG. 2, patterns of the second metal layer M2 may have a resistance higher than the nominal resistance and a capacitance lower than the nominal capacitance. In the integrated circuit 10c illustrated on the right side of FIG. 2, patterns of the second metal layer M2 may have a resistance lower than the nominal resistance and a capacitance higher than the nominal capacitance.

Figure 3:
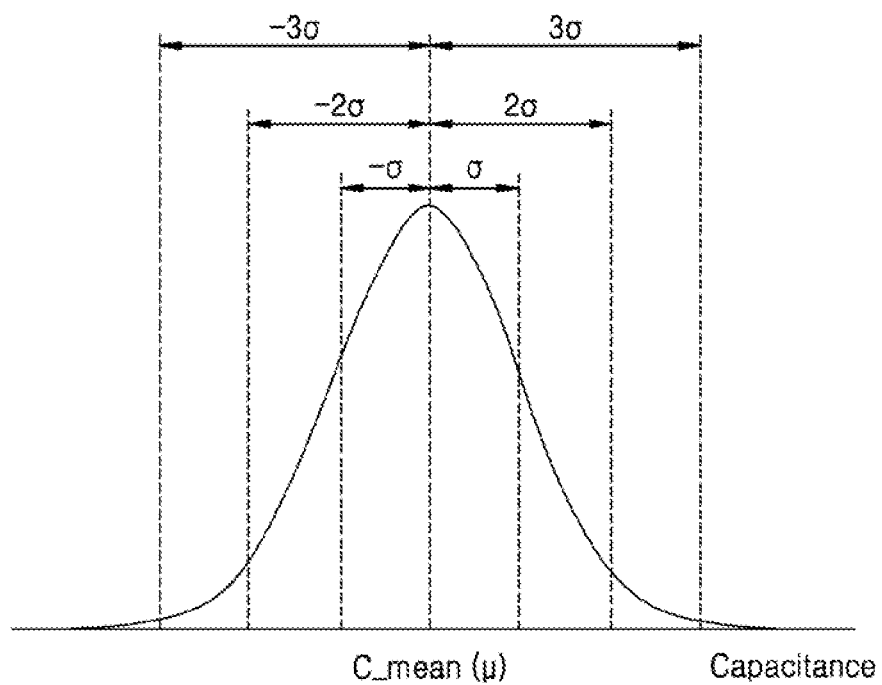
FIG. 3 is a graph showing the distribution of a unit capacitance of a wiring layer according to an exemplary embodiment of the inventive concept.

FIG. 3 is a graph showing the distribution of a unit capacitance of a wiring layer. The horizontal axis of FIG. 3 indicates a unit capacitance of a wiring layer (e.g., a metal layer), and the vertical axis of FIG. 3 indicates the number of integrated circuits having corresponding unit capacitances.

Referring to FIG. 3, the unit capacitance of a wiring layer may have a positive variation or a negative variation, centering on an average value (or nominal value) C_mean. The distribution of the unit capacitance of the wiring layer may be a probability distribution that is defined as an average value $\mu$ and a standard deviation $\sigma$. Accordingly, C_mean=$\mu$.

When timing of an integrated circuit is analyzed based on the distribution of a fixed characteristic value instead of the fixed characteristic value for elements included in the integrated circuit, for example, a pattern formed in a wiring layer, a via, and a transistor, the accuracy of an analysis result may be increased. However, since this analysis (e.g., a statistical timing analysis) analyzes the distribution of a characteristic value corresponding to each of the elements included in the integrated circuit and a correlation of distributions between the elements, a long analysis time may be required. However, an analysis for a corner case may be relatively short.

A method of analyzing timing of an integrated circuit, according to an exemplary embodiment of the inventive concept, may be used based on the number of conducting segments in which some capacitances in the distribution of a unit capacitance of a wiring layer correspond to an interconnection. Accordingly, the method may have a relatively short analysis time and increase the accuracy of an analysis result. For example, as illustrated in FIG. 3, capacitances that are separate from the average value $\mu$ by as much as multiples of the standard deviation $\sigma$, for example, $\sigma$, $2\sigma$, and $3\sigma$, may be used. Although capacitances having positive deviations $\sigma$, $2\sigma$, and $3\sigma$ from the average value $\mu$ are illustrated in FIG. 3, capacitances having negative deviations $-\sigma$, $-2\sigma$, and $-3\sigma$ from the average value $\mu$ may be used. For example, a capacitance on the side of the positive deviations $\sigma$, $2\sigma$, and $3\sigma$ is higher than the nominal capacitance. A capacitance on the side of the negative deviations $-\sigma$, $-2\sigma$, and $-3\sigma$ is lower than the nominal capacitance.

Although a unit capacitance of a wiring layer is illustrated in FIG. 3, a unit resistance of the wiring layer may also have a distribution similar to that of the graph illustrated in FIG. 3. Hereinafter, the method of analyzing an integrated circuit, according to an exemplary embodiment of the inventive concept, is mainly described in terms of capacitance for the convenience of description. However, extraction and calculation of resistance may also be implemented by using a similar method.

Figure 4:
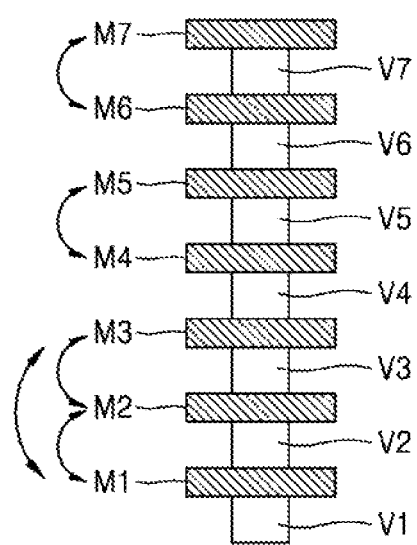
FIG. 4 is a diagram of a structure in which a plurality of wiring layers are stacked in an integrated circuit, according to an exemplary embodiment of the inventive concept.

FIG. 4 is a diagram of a structure in which a plurality of wiring layers are stacked in an integrated circuit, according to an exemplary embodiment of the inventive concept. As described above, each of the wiring layers may include a metal, and may be referred to as a metal layer.

Referring to FIG. 4, the integrated circuit may include first through seventh metal layers M1 to M7, and may also include first through seventh via layers V1 to V7 that electrically connect the first through seventh metal layers M1 to M7 to each other. For example, the first via layer V1 may form a contact with an active region of a transistor disposed under the first via layer V1, and may electrically connect the first metal layer M1 to the active region of the transistor. The second via layer V2 may electrically connect the second metal layer M2 to the first metal layer M1, the third via layer V3 may electrically connect the third metal layer M3 to the second metal layer M2, and so on.

The first through seventh metal layers M1 to M7 may have different correlations according to manufacturing processes. In other words, in a case in which a deposition process and an etching process are performed at time points close to each other or by methods similar to each other, or in a case in which materials used in the processes are similar to each other, when processes of forming a pattern in different metal layers are correlated with each other, the metal layers having a pattern formed therein may have a relatively strong correlation. In a case in which a deposition process and an etching process are performed at time points not close to each other or by methods different from each other, or in a case in which materials used in the manufacturing processes are different from each other, when processes of forming a pattern in different metal layers are not correlated with each other, the metal layers having a pattern formed therein may have a relatively weak correlation. For example, as illustrated in FIG. 4 by the curvy arrows, the first through third metal layers M1 to M3 may have a strong correlation with one another, the fourth and fifth metal layers M4 and M5 may have a strong correlation with each other, and the sixth and seventh metal layers M6 and M7 may have a strong correlation with each other.

If variations in the same direction of, for example, respective maximum unit capacitances, are applied to patterns formed in the first metal layer M1 and the fourth metal layer M4, respectively, which have a weak correlation with each other, when analyzing a corner case of an integrated circuit, a resultant timing analysis may be pessimistic. As described below with reference to FIG. 14, vias may have independent characteristics and a resistance of each via may have a similar distribution to the graph illustrated in FIG. 3. Thus, if all vias included in an interconnection are regarded as having variations in the same direction when analyzing a corner case of an integrated circuit, a resultant timing analysis may be pessimistic or optimistic. Examples of this phenomenon will be described below in detail with reference to FIGS. 5A and 5B.

Figure 5A:
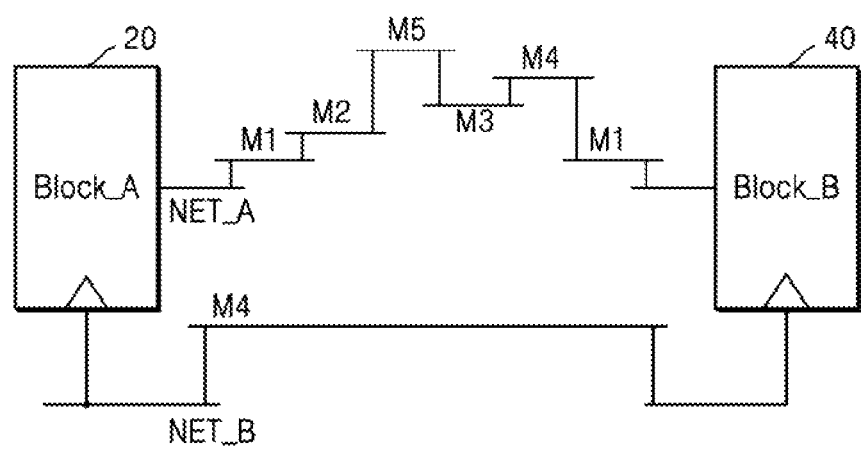
FIG. 5A is a diagram illustrating an analysis result when variations in the same direction are applied to elements of an integrated circuit when analyzing a corner case of the integrated circuit, according to an exemplary embodiment of the inventive concept.
Figure 5B:
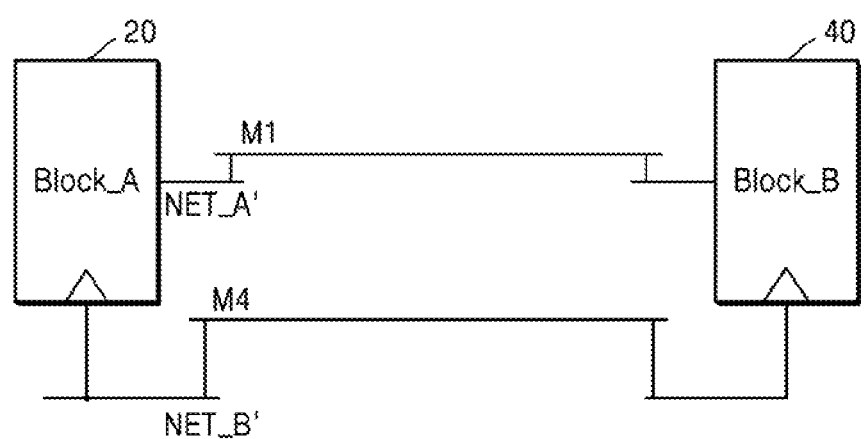
FIG. 5B is a diagram illustrating an analysis result when variations in the same direction are applied to elements of an integrated circuit when analyzing a corner case of the integrated circuit, according to an exemplary embodiment of the inventive concept.

FIG. 5A is a diagram illustrating a pessimistic analysis result when variations in the same direction are applied to elements of an integrated circuit when analyzing a corner case of the integrated circuit, according to an exemplary embodiment of the inventive concept. FIG. 5B is a diagram illustrating an optimistic analysis result when variations in the same direction are applied to elements of an integrated circuit when analyzing a corner case of the integrated circuit, according to an exemplary embodiment of the inventive concept.

Referring to FIG. 5A, the integrated circuit may include two blocks 20 and 40, and the two blocks 20 and 40 may be electrically connected to each other via two nets NET_A, NET_B. Block 20 may be referred to as Block_A and block 40 may be referred to as Block B. The net NET_A may provide a path (e.g., a data path) for transmitting a signal output from the block 20 to the block 40, and the net NET_B may provide a path (e.g., a clock path) through which a clock signal is supplied to the block 20 and the block 40. For example, each of the blocks 20 and 40 may include at least one flip-flop for receiving the clock signal via the net NET_B. As illustrated in FIG. 5A, in a layout of the integrated circuit, the net NET_A (or an interconnection of the net NET_A) may be formed by using a greater number of metal layers than the net NET_B. For example, the net NET_A is formed by using the metal layers M1, M2, M3, M4, and M5, and the net NET_B is formed by using the metal layer M4. Thus, the net NET_A may be formed by using more metal layers and vias than the net NET_B. Each of the metal layers M1, M2, M3, and M4 of the net NET_A may include a plurality of patterns. The net NET_A may include vias connected to at least two of the metal layers M1, M2, M3, M4 and M5. The net NET_B may include patterns formed in the fourth metal layer M4 and vias connected to the fourth metal layer M4.

When a corner case is analyzed by applying a variation in a direction increasing a delay time of a signal to patterns and vias in the net NET_A, a delay time of the data path may be calculated to be relatively long compared to that of the clock path. Accordingly, a cost (e.g., a design time and/or an additional resource of the integrated circuit) for satisfying a setup time may occur and the performance of the integrated circuit may be lowered.

Referring to FIG. 5B, similar to the example of FIG. 5A, a net NET_A' may provide a data path and a net NET_B' may provide a clock path. As illustrated in FIG. 5B, in a layout of the integrated circuit, the net NET_A' may include patterns and vias formed in a first metal layer M1, and the net NET_B' may include patterns and vias formed in a fourth metal layer M4. The first metal layer M1 and the fourth metal layer M4 have a weak correlation with each other.

When variation in a direction decreasing a delay time of a signal is applied to the patterns and vias, included in the net NET_A' and the net NET_B', without taking into account a weak correlation between the first metal layer M1 and the fourth metal layer M4, an optimistic analysis result may be provided. For example, an analysis result may estimate a margin for a setup time to be relatively large due to a delay time of the data path calculated to be relatively small. Thus, when the first metal layer M1 is formed in a direction increasing a delay time of a signal, whereas the fourth metal layer M4 is formed in a direction decreasing a delay time of a signal, the setup time may be violated. In addition, when a variation in a direction increasing a delay time of a signal is applied to patterns and vias included in the net NET_A' and the net NET_B' without taking into account a weak correlation between the first metal layer M1 and the fourth metal layer M4, an optimistic analysis result may be provided. For example, an analysis result may estimate a margin for a hold time to be relatively large due to a delay time of the data path calculated to be relatively large. Thus, when the first metal layer M1 is formed in a direction decreasing a delay time of a signal, and the fourth metal layer M4 is formed in a direction increasing a delay time of a signal, the hold time may be violated. As a result, an integrated circuit having a low performance margin may be designed. Thus, a failure rate of a manufactured integrated circuit may increase.

Figure 6:
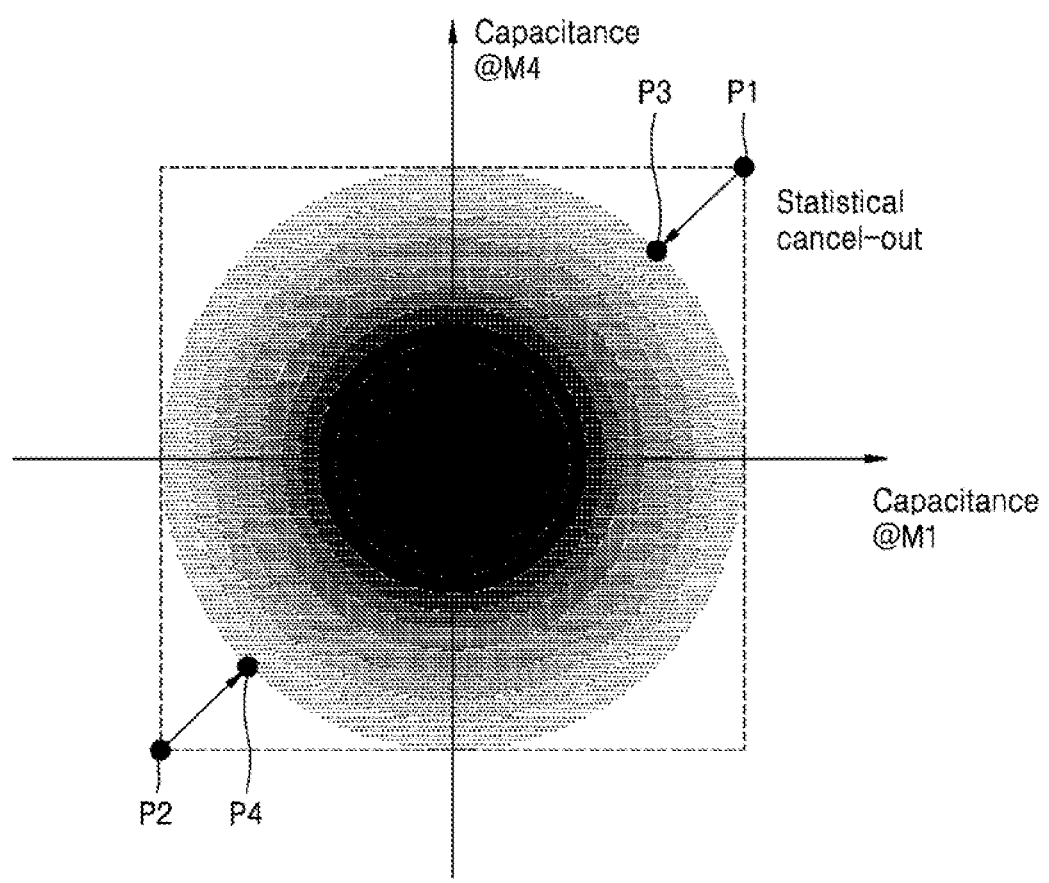
FIG. 6 is a graph showing a result of a method of analyzing an integrated circuit, according to an exemplary embodiment of the inventive concept.

FIG. 6 is a graph showing a result of a method of analyzing an integrated circuit, according to an exemplary embodiment of the inventive concept. In the graph of FIG. 6, the horizontal axis indicates a unit capacitance of the first metal layer M1, and the vertical axis indicates a unit capacitance of the fourth metal layer M4. A point at which the horizontal axis meets the vertical axis indicates a nominal value of the unit capacitance of the first metal layer M1 and a nominal value of the unit capacitance of the fourth metal layer M4.

As described above with reference to FIG. 4, a pattern formed in the first metal layer M1 and a pattern formed in the fourth metal layer M4 may have a weak correlation with each other because the first metal layer M1 and the fourth metal layer M4 have a weak correlation with each other. Accordingly, the unit capacitance of the first metal layer M1 and the unit capacitance of the fourth metal layer M4 may have independent distributions. As indicated by a dark area in FIG. 6, the probability that the unit capacitances of the first and fourth metal layers M1 and M4 have nominal values (or average values) may be relatively high.

When not taking into account a weak correlation between the first metal layer M1 and the fourth metal layer M4, a corner case in which a variation in a direction increasing a delay time of a signal has been reflected may correspond to a point P1, and a corner case in which a variation in a direction decreasing a delay time of a signal has been reflected may correspond to a point P2. However, as shown in FIG. 6, the probability that the first metal layer M1 and the fourth metal layer M4 have unit capacitances corresponding to the points P1 and P2 is very low. Thus, analyzing a corner case based on the points P1 and P2 may be pessimistic or optimistic.

A method according to an exemplary embodiment of the inventive concept may move the points P1 and P2 to corner cases points P3 and P4, respectively, as shown in FIG. 6 by using statistical cancel-out. In other words, by making a corner case in which variation in a direction increasing a delay time of a signal has been reflected to correspond to the point P3 instead of the point P1, an analysis of the corner case may be appropriately pessimistic. In addition, by making a corner case in which variation in a direction decreasing a delay time of a signal has been reflected to correspond to the point P4 instead of the point P2, an analysis of the corner case may be appropriately optimistic. Methods of analyzing an integrated circuit according to exemplary embodiments of the inventive concept will be described in detail below with reference to the diagrams.

Figure 7:
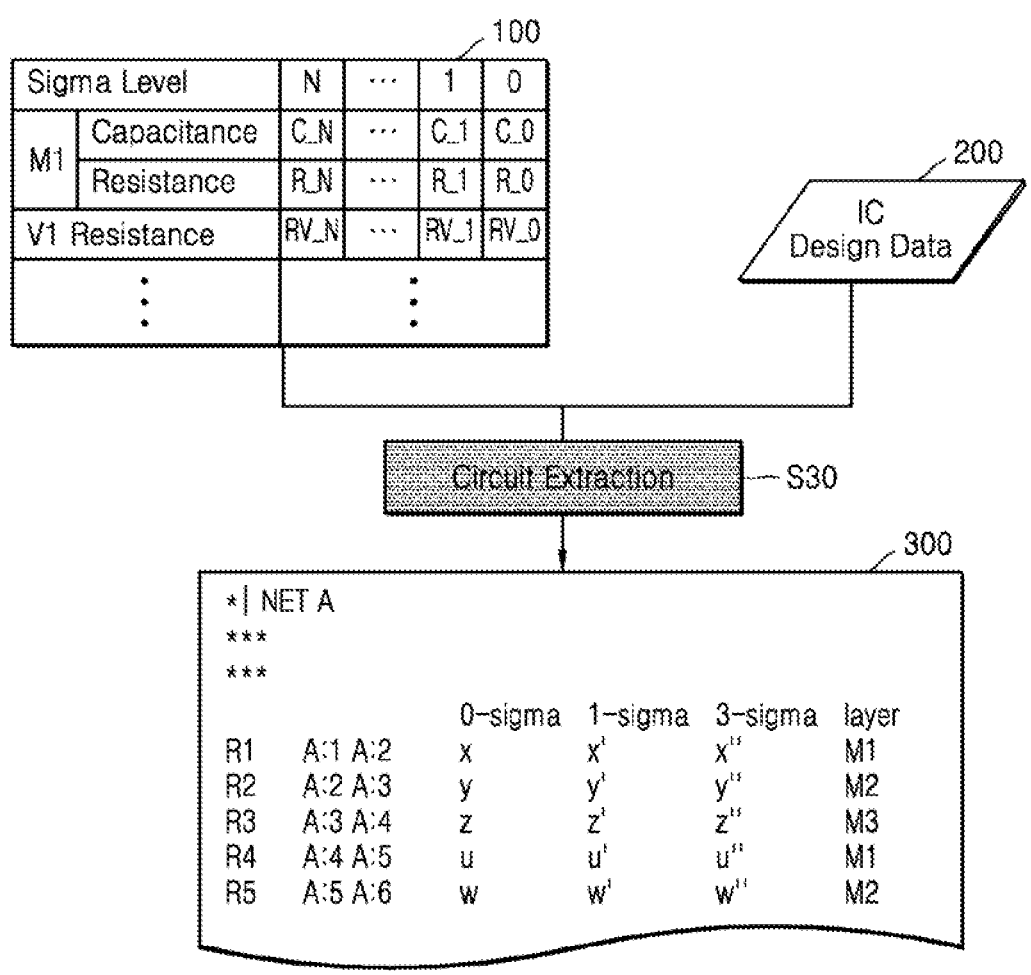
FIG. 7 is a flowchart illustrating operation S3 of FIG. 1, according to an exemplary embodiment of the inventive concept.

FIG. 7 is a flowchart illustrating operation S3 of FIG. 1, according to an exemplary embodiment of the inventive concept. As described above with reference to FIG. 1, an operation of providing a plurality of resistances and a plurality of capacitances, which correspond to a first net, based on a process variation, may be performed in operation S3.

Referring to FIG. 7, a technology file 100 and a design data 200 of an integrated circuit may be provided. The technology file 100 may include unit resistances and unit capacitances of metal layers based on a process, and may also include unit resistances of via layers. Also, the technology file 100 may include a plurality of unit resistances, a plurality of unit capacitances for one metal layer and a plurality of unit resistances for one via layer, based on the distributions of unit resistance and unit capacitance which are determined by processes. For example, as illustrated in FIG. 7, the technology file 100 may include a value C_0, which is an average value μ in the distribution of a unit capacitance of a first metal layer M1, and values C_1, to C_N that are separate from the average value μ by as much as multiples of a standard deviation σ, respectively. For example, the values C_1, to C_N are larger or smaller than the average value μ by as much as multiples of a standard deviation σ. In addition, the technology file 100 may include a value R_0, which is an average value μ in the distribution of a unit resistance of the first metal layer M1, and values R_1, to R_N that are separate from the average value μ of the unit resistance by as much as multiples of a standard deviation σ, respectively.

According to an exemplary embodiment of the inventive concept, the technology file 100 may include an average value μ and a standard deviation σ, which correspond to one metal layer, instead of a plurality of unit capacitances for one metal layer, unlike the example illustrated in FIG. 7. In operation S30 of FIG. 7, a plurality of unit capacitances may be generated based on the average value μ and the standard deviation σ.

A circuit extraction operation may be performed in operation S30, and thus, a parasitics description file 300 may be formed. The circuit extraction operation may be referred to as an operation of extracting an equivalent circuit diagram of an integrated circuit from layout data of the integrated circuit. For example, with reference to a technology file 100 including information about a process of manufacturing a semiconductor device including an integrated circuit, a parasitic resistance "R" and a parasitic capacitance "C" according to a physical structure of an interconnection may be extracted from the topological data included in the design data 200 of the integrated circuit. Accordingly, the circuit extraction operation may be referred to as an RC extraction operation.

The parasitics description file 300 may include a plurality of resistance values and/or a plurality of capacitances, which correspond to conducting segments forming a net. For example, the plurality of capacitances may include a value calculated based on an average value μ (e.g., zero σ) of a unit capacitance and values calculated based on unit capacitances that are separate by as much as multiples (e.g., σ, 2σ, 3σ, and the like) of a standard deviation from the average value μ of the unit capacitance. Accordingly, as illustrated in FIG. 7, in the parasitics description file 300, a resistance R1 indicating a resistance of one conducting segment of a net A may include three values x, x', and x", and the three values x, x', and x" may be capacitance values corresponding to zero σ, σ, and 3σ, respectively.

In some embodiments, the parasitics description file 300 may further include information about layers of conducting segments. For example, as shown in FIG. 7, the net A may include resistances R1 and R4 of two conducting segments included in the first metal layer M1, resistances R2 and R5 of two conducting segments included in the second metal layer M2, and a resistance R3 of a conducting segment included in the third metal layer M3. In some embodiments, the information about the layers of the conducting segments may be used to calculate the variability of each layer, as described below with reference to FIG. 10, and may be used to reflect a process shift, as described below with reference to FIG. 13.

Figure 8A:
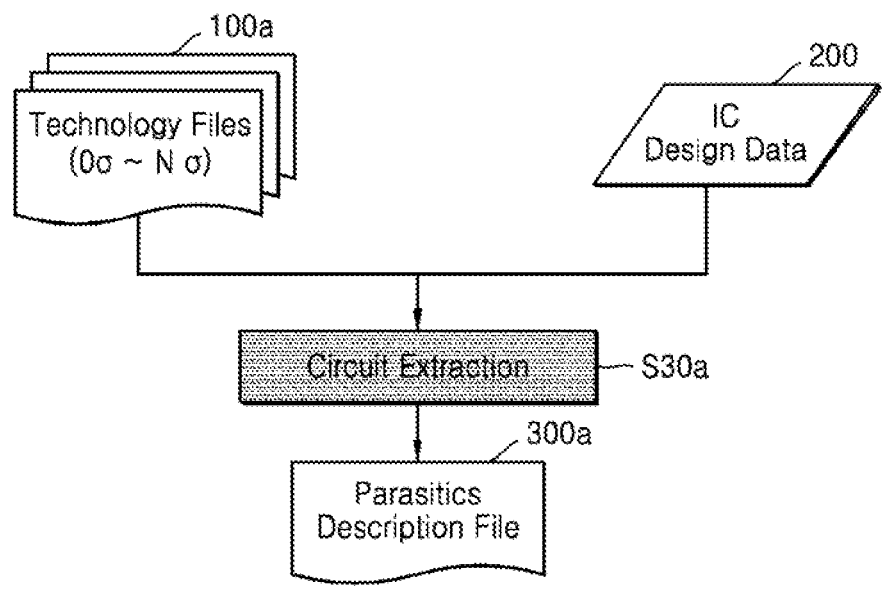
FIG. 8A is a flowchart illustrating an implementation of operation S30 of FIG. 7, according to an exemplary embodiment of the inventive concept.
Figure 8B:
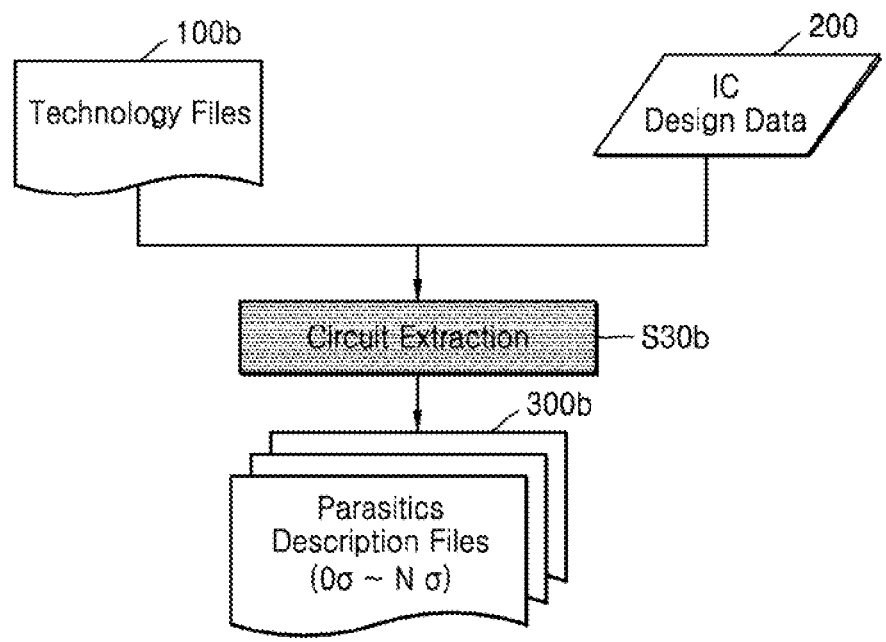
FIG. 8B is a flowchart illustrating an implementation of operation S30 of FIG. 7, according to an exemplary embodiment of the inventive concept.

FIG. 8A is a flowchart illustrating an implementation of operation S30 of FIG. 7, according to an exemplary embodiment of the inventive concept. FIG. 8B is a flowchart illustrating an implementation of operation S30 of FIG. 7, according to an exemplary embodiment of the inventive concept. For example, FIG. 8A is a flowchart illustrating an implementation example in which a plurality of technology files 100a are provided. FIG. 8B is a flowchart illustrating an implementation example of generating a plurality of parasitics description files 300b.

Referring to FIG. 8A, a plurality of technology files 100a may be provided. Each of the plurality of technology files 100a may correspond to one column in the technology file 100 of FIG. 7. In other words, as illustrated in FIG. 8A, N+1 technology files 100a may include unit resistances and unit capacitances, which correspond to zero σ through Nσ, or process parameters (e.g., geometric information and dielectric) from which the unit resistances and the unit capacitances may be derived. In operation S30a, a plurality of resistances and a plurality of capacitances may be extracted based on the design data 200 of an integrated circuit and each of the plurality of technology files 100a. The extracted plurality of resistances and the extracted plurality of capacitances may be included in a parasitics description file 300a.

Referring to FIG. 8B, the plurality of parasitics description files 300b may be generated. Each of the plurality of parasitics description files 300b may correspond to one column in the parasitics description file 300 of FIG. 7. In other words, as illustrated in FIG. 8B, N+1 parasitics description files 300b may include resistances and capacitances, which correspond to zero σ through Nσ. In operation S30b, a plurality of resistances and a plurality of capacitances may be extracted based on design data 200 of an integrated circuit and technology files 100b. The extracted plurality of resistances and the extracted plurality of capacitances may be included in each of the plurality of parasitics description files 300b according to a coefficient of a standard deviation that is the base of extraction.

Figure 9:
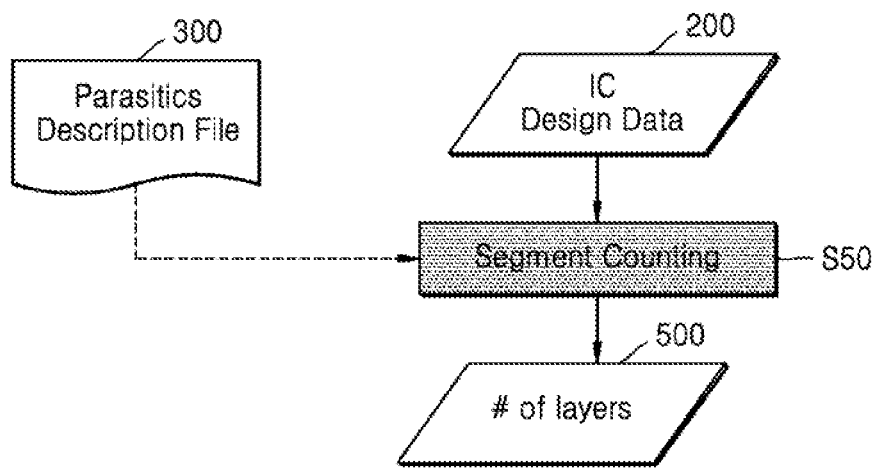
FIG. 9 is a flowchart illustrating operation S5 of FIG. 1, according to an exemplary embodiment of the inventive concept.

FIG. 9 is a flowchart illustrating operation S5 of FIG. 1, according to an exemplary embodiment of the inventive concept. As described above with reference to FIG. 1, an operation of counting the number of conducting segments corresponding to a first net may be performed in operation S5.

Referring to FIG. 9, the integrated circuit design data 200 may be provided. An operation of counting conducting segments may be performed in operation S50, and data 500 including the number of layers, i.e., metal layers and via layers, and/or the number of vias may be generated. The number of metal layers and/or the number of vias may be used for determining a level (or a sigma level) of a standard deviation in the analysis of a corner case. In some embodiments, the data 500 may include a counted number of layers and/or a counted number of vias. In some embodiments, the data 500 may include a calculated effective number of layers and/or a calculated effective number of vias.

According to an exemplary embodiment of the inventive concept, a mashies description file 300 may be provided as indicated by a dashed line in FIG. 9. In operation S50, the number of conducting segments, e.g., vias, may be counted based on a plurality of resistances and a plurality of capacitances included in the parasitics description file 300. Operation S50 will be described in detail below with reference to the diagrams.

Figure 10:
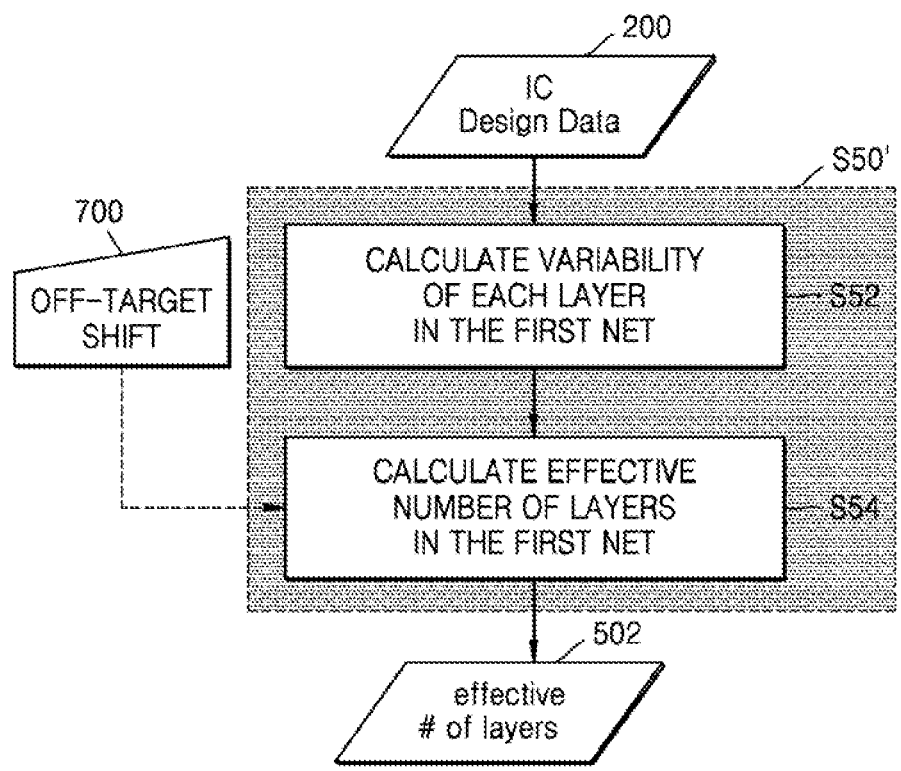
FIG. 10 is a flowchart illustrating operation S50 of FIG. 9, according to an exemplary embodiment of the inventive concept.

FIG. 10 is a flowchart illustrating operation S50' corresponding to an example of operation S50 of FIG. 9, according to an exemplary embodiment of the inventive concept. As illustrated in FIG. 10, operation S50' may include operation S52 and operation S54, and operation S54 may be selectively performed.

In operation S52, an operation of calculating the variability of each layer in a first net from the integrated circuit design data 200 may be performed. In the present specification, the variability may be referred to as a value indicating a degree of scattering of a resistance and/or a capacitance of one layer. For example, a metal layer may have a resistance variability ($\Delta R_M$) and a capacitance variability ($\Delta C_M$), and a via layer may have a resistance variability ($\Delta R_V$). In some embodiments, the resistance variability may be calculated based on a difference between two or more resistances corresponding to different sigma levels, and the capacitance variability may be calculated based on two or more capacitances corresponding to different sigma levels. For example, the resistance variability may be calculated based on a difference between two resistances corresponding to zero σ and σ. Accordingly, in the parasitics description file 300 of FIG. 7, a resistance variability ($\Delta R_{M1}$) of the first metal layer M1 included in the net A may be calculated as |(x'−x)+(u'−u)|, a resistance variability ($\Delta R_{M2}$) of the second metal layer M2 included in the net A may be calculated as |(y'−y)+(w+−w)|, and a resistance variability ($\Delta R_{M3}$) of the third metal layer M3 included in the net A may be calculated as |z'−z|. In a similar manner, capacitance variabilities ($\Delta C_{M1}$ to $\Delta C_{M3}$) corresponding to the first to third metal layers M1 to M3 included in the net A may be calculated and a resistance variability ($\Delta R_{V1}$) of a via layer, e.g., the first via layer V1, may be calculated.

In some embodiments, sigma levels used to calculate the variability may be determined based on the purpose of an analysis of an integrated circuit, and the determined sigma levels may be commonly used for nets included in the integrated circuit. For example, when capacitances (or resistances) corresponding to the sigma levels are not in a linear relationship, as illustrated in FIG. 3, an effective number of layers calculated by Equation 1 may depend on the sigma levels used to calculate the variability. In some embodiments, the sigma levels used to calculate the variability may be determined by whether a user pessimistically or optimistically analyzes an integrated circuit. For example, in the parasitics description file 300 of FIG. 7, when a user intends to pessimistically analyze an integrated circuit, the resistance variability ($\Delta_{RM}$) of a metal layer may be calculated based on a difference between zero σ and 3σ. On the other hand, when the user intends to optimistically analyze the integrated circuit, the resistance variability ($\Delta_{RM}$) of a metal layer may be calculated based on a difference between zero σ and σ.

In operation S54, an operation of calculating an effective number of layers in the first net may be performed. The effective number of layers, which is a value derived from the variability of each layer calculated in operation S52, may be more suitable for analyzing a corner case. For example, the larger the variability of a metal layer (or a wiring layer) is, the more an influence according to a process variation may increase. Accordingly, the effective number of metal layers may be calculated based on the variabilities (i.e., resistance variabilities and capacitance variabilities) of the metal layers. In some embodiments, the effective number of layers for resistance and the effective number of layers for capacitance in the first net may be calculated by using the following Equation 1.

(effective number of layers for resistance) = [Equation 1]
$$\frac{\left(\sum \Delta R_i\right)^2}{\sum \Delta R_i^2 + 2\rho \sum \sum \Delta R_i \Delta R_j}$$

(effective number of layers for capacitance) =
$$\frac{\left(\sum \Delta C_i\right)^2}{\sum \Delta C_i^2 + 2\rho \sum \sum \Delta C_i \Delta C_j}$$

In Equation 1, $R_i$ may denote the resistance variability of an i-th layer (i.e., metal layer or via layer), $C_i$ may denote the capacitance variability of the i-th layer (i.e., metal layer or via layer), and ρ may denote a correlation between two layers. Accordingly, data 502 including the effective number of layers included in the first net may be generated by operation S50'.

According to an exemplary embodiment of the inventive concept, in order to calculate the effective number of layers from characteristics defined by the technology file 100 by taking into account an error (which may be referred to as a process shift) occurring in an actual process in which an integrated circuit is fabricated, an off-target shift 700 may be provided as indicated by a dashed line in FIG. 10. Integrated circuits manufactured in the same process may not only have different characteristics due to a process variation, but also may have, in common, characteristics changed by a process shift. For example, due to various causes, an integrated circuit having a unit resistance and/or a unit capacitance which are different from values (e.g., the unit resistance and/or the unit capacitance) included in the technology file 100 of FIG. 1 may be manufactured by a process. Accordingly, for analysis of an actual integrated circuit, the off-target shift 700 may be provided as information about a difference between values corresponding to a process in which an integrated circuit is actually manufactured and values included in the technology file 100, and the off-target shift 700 may be used to calculate the effective number of layers. Accordingly, the effective number of layers in operation S54 may be calculated based on the off-target shift 700 as well as variabilities calculated in operation S52. For example, when a unit resistance R_0' and a unit capacitance C_0' of the first metal layer M1 are respectively different from the unit resistance R_0 and the unit capacitance C_0 included in the technology file 100 of FIG. 7 according to manufacturing processes, the off-target shift 700 may include values defined by Equation 2 below as information indicating a process shift.

$$ROFF_{M1} = \frac{R\_0'}{R\_0}$$ [Equation 2]

$$COFF_{M1} = \frac{C\_0'}{C\_0}$$

In Equation 2, $ROFF_{M1}$ may refer to a rate of change in unit resistance in the first metal layer M1 due to a process shift, and $COFF_{M1}$ may refer to a rate of change in unit capacitance in the first metal layer M1 due to a process shift. For example, if no process shift occurs in the first metal layer M1, both $ROFF_{M1}$ and $COFF_{M1}$ may be 1. The off-target shift 700 may include a value corresponding to a metal layer and/or a via layer, calculated in a manner similar to Equation 2. $ROFF_{M1}$ may be used to adjust the resistance variability $\Delta R_{M1}$ of the first metal layer M1 and $COFF_{M1}$ may be used to adjust the capacitance variability $\Delta C_{M1}$ of the first metal layer M1. Accordingly, the effective number of layers for resistance and the effective number of layers for capacitance in the first net may be calculated by Equation 3 below.

(effective number of layers for resistance) = [Equation 3]
$$\frac{\left(\sum ROFF_i \Delta R_i\right)^2}{\sum (ROFF_i \Delta R_i)^2 + 2\rho \sum \sum (ROFF_i \Delta R_i \cdot ROFF_j \Delta R_j)}$$

$$\text{(effective number of layers for capacitance)} = \frac{\left(\sum COFF_i \Delta C_i\right)^2}{\sum (COFF_i \Delta C_i)^2 + 2\rho \sum \sum (COFF_i \Delta C_i \cdot COFF_j \Delta C_j)}$$

In Equation 3, $ROFF_i$ may refer to a rate of change in unit resistance of an i-th layer (metal layer or via layer) due to a process shift, and $COFF_i$ may refer to a rate of change in unit capacitance of the i-th layer (metal layer or via layer) due to a process shift. In the present specification, $ROFF_i$ may be simply referred to as a shift of the resistance of the i-th layer, and $COFF_i$ may be simply referred to as a shift of the capacitance of the i-th layer.

Figure 11:
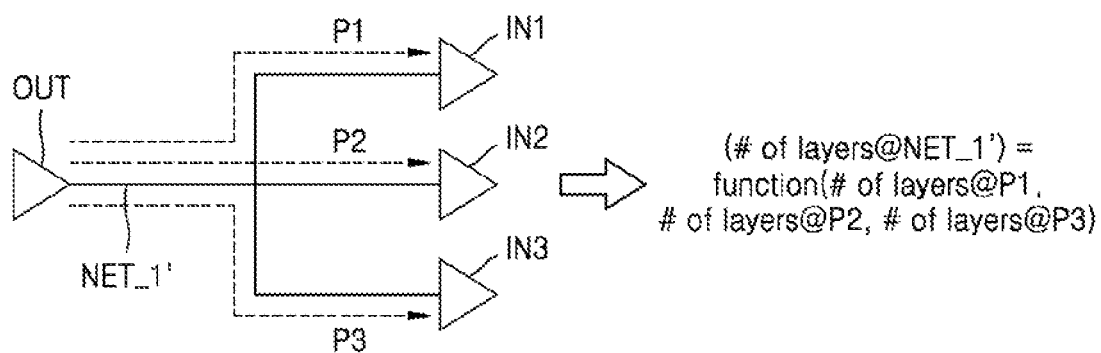
FIG. 11 is a diagram illustrating counting the number of layers corresponding to a net connected to three or more pins, according to an exemplary embodiment of the inventive concept.

FIG. 11 is a diagram illustrating counting the number of layers corresponding to a net connected to three or more pins, according to an exemplary embodiment of the inventive concept.

An integrated circuit may include a net that electrically connects three or more pins, for example, one output pin and two or more input pins, to each other. For example, as illustrated in FIG. 11, a first net NET_1' may electrically connect one output pin OUT and three input pins IN1 to IN3 to each other. Accordingly, a signal output from the output pin OUT may be transmitted to one of the three input pins IN1 to IN3 via one of three paths, e.g., first through third paths P1 to P3, respectively.

Referring to FIG. 11, the number of layers of the first net NET_1' may be a function of the number of layers of each of the first through third paths P1 to P3. For example, as the number of layers increases, a difference (e.g., variation) between a corner resistance and a nominal resistance decreases. Thus, to conservatively perform a timing analysis of the net, the number of layers of a net may be the number of layers of the path that has the least number of layers from among the plurality of paths. In other words, the number of layers of the first net NET_1' may be a minimum value of the number of layers of the first through third paths P1 to P3, respectively. As described below with reference to FIGS. 19 and 20, the number of layers corresponding to each path may be used in a path-based analysis (PBA).

Figure 12:
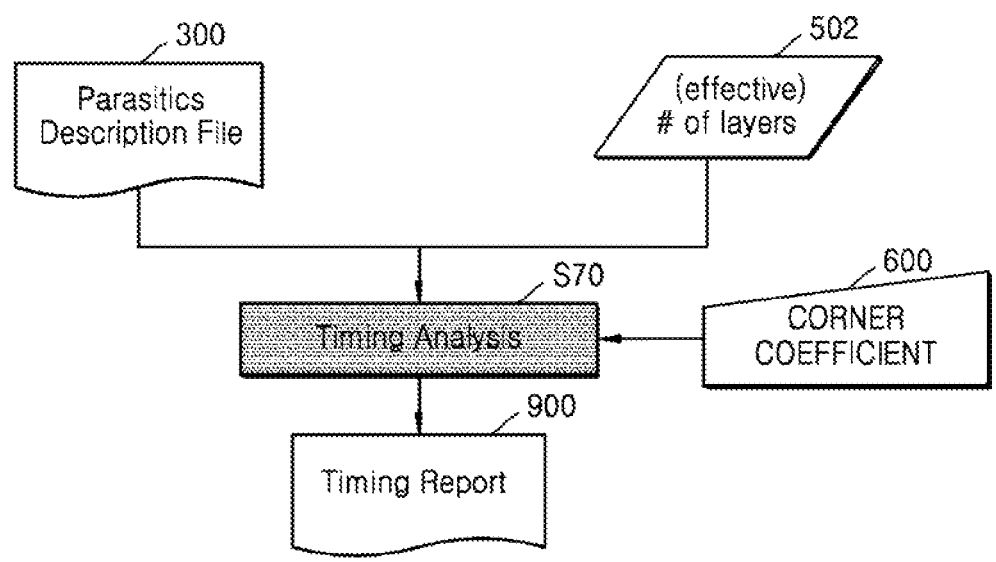
FIG. 12 is a flowchart illustrating operations S7 and S9 of FIG. 1, according to an exemplary embodiment of the inventive concept.

FIG. 12 is a flowchart illustrating operations S7 and S9 of FIG. 1, according to an exemplary embodiment of the inventive concept. Operation S7 and operation S9 may be performed by a timing analysis operation S70. As described above with reference to FIG. 1, an operation of calculating a corner resistance and a corner capacitance of a first net may be performed in operation S7, and an operation of generating a timing report of an integrated circuit may be performed in operation S9.

Referring to FIG. 12, a parasitics description file 300 may be provided, and data 502 including the effective number of layers may be provided. A timing analysis may be performed in operation S70, and thus, a timing report 900 may be generated.

Referring to FIG. 12, data 600 including a corner coefficient may be provided. The corner coefficient may be a coefficient indicating a level of a corner case which a designer desires to analyze. For example, the corner coefficient may correspond to a coefficient of a standard deviation of a probability distribution according to a process variation. In other words, referring to FIG. 7, the corner coefficient may be a coefficient of a standard deviation which a designer desires to apply to an analysis of a corner case. For example, when a designer desires to analyze a worst case, the designer may set the data 600 including N as a corner coefficient. N may be the number of multiples of the standard deviation σ.

In operation S70, an operation of analyzing a timing of an integrated circuit based on the parasitics description file 300, the data 502 including the effective number of layers, and the data 600 including a corner coefficient may be performed.

Figure 13:
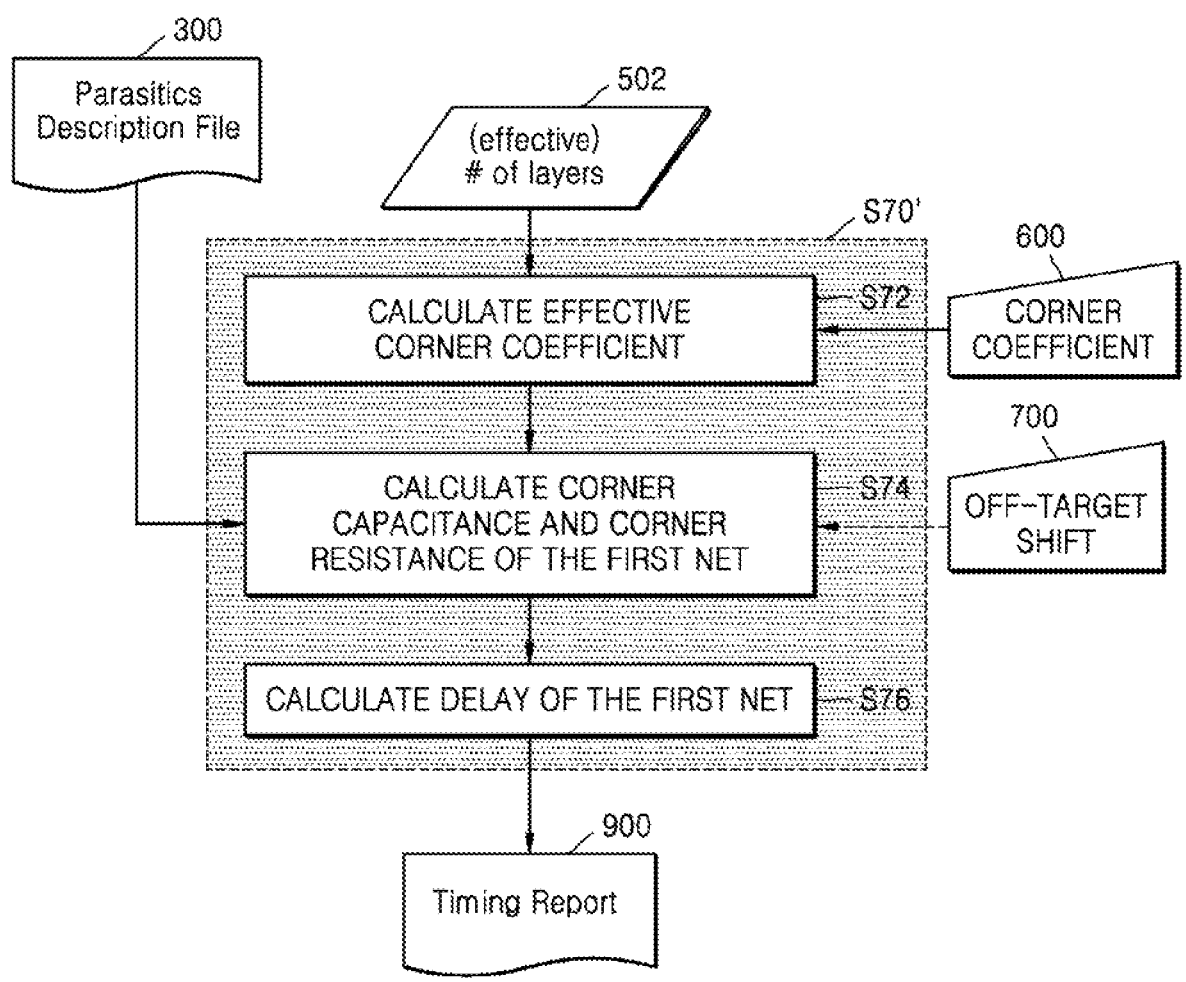
FIG. 13 is a flowchart illustrating operation S70 of FIG. 12, according to an exemplary embodiment of the inventive concept.

FIG. 13 is a flowchart illustrating operation S70' corresponding to operation S70 of FIG. 12, according to an exemplary embodiment of the inventive concept. As described above with reference to FIG. 12, an operation of analyzing a timing of an integrated circuit may be performed in operation S70. Thus, a timing report 900 may be generated. As illustrated in FIG. 13, operation S70' may include operation S72, operation S74, and operation S76.

In operation S72, an operation of calculating an effective corner coefficient may be performed. As described above with reference to FIG. 6, all conducting segments may be prevented, by a stochastic offset, from having a maximum or minimum characteristic value according to a process variation. As the number of independent conducting segments, e.g., metal layers, increases, the degree of the stochastic offset may increase. Accordingly, an effective corner coefficient that is inversely proportional to the number of layers may be calculated in operation S72. For example, the effective corner coefficient for resistance and the effective corner coefficient for capacitance may be calculated by using the following Equation 4.

$$\text{(effective corner coefficient for resistance)} = \frac{\text{(corner coefficient)}}{\sqrt{\text{(effective number of layers for resistance)}}}$$

$$\text{(effective corner coefficient for capacitance)} = \frac{\text{(corner coefficient)}}{\sqrt{\text{(effective number of layers for capacitance)}}}$$

[Equation 4]

In operation S74, an operation of calculating a corner capacitance and a corner resistance of a first net may be performed based on the data 502 including the effective number of layers and the parasitics description file 300. Referring to FIG. 7, when a calculated effective corner coefficient is 1, a resistance of a resistor R1 which indicates a resistance of one conducting segment of a net A may be determined as x'. In addition, when a calculated effective corner coefficient is 0.5, the resistance of resistor R1 may be calculated by interpolating x corresponding to 0σ and x' corresponding to 1σ.

According to an exemplary embodiment of the inventive concept, in order to adjust a corner capacitance and corner resistance of a first net based on a process shift, an off-target shift 700 may be provided as shown by a dashed line in FIG. 13. As described above with reference to FIG. 10, the off-target shift 700 may include information on a process shift, and in operation S74, the corner capacitance and corner resistance of the first net may be adjusted based on the off-target shift 700. To this end, in operation S74, a portion $RP_i$ of the resistance of an i-th layer with respect to the total resistance in the first net and a portion $CP_i$ of the capacitance of the i-th layer with respect to the total capacitance in the first net may be calculated by Equation 5.

$$RP_i = \frac{R_i}{\sum R_i}$$ [Equation 5]

$$CP_i = \frac{C_i}{\sum C_i}$$

In Equation 5, $R_i$ may refer to the resistance of the i-th layer in the first net, and $\sum R_i$ may refer to the sum of the resistances of layers in the first net, $C_i$ may refer to the capacitance of the i-th layer in the first net, and $\sum C_i$ may refer to the sum of the capacitances of the layers in the first net. When a corner resistance and a corner capacitance of the first net, calculated according to effective corner coefficients, are R and C, respectively, a corner resistance R' and a corner capacitance C' of the first net, adjusted based on a process shift, may be calculated by Equation 6.

$$R' = R \cdot (1 + \sum(ROFF_i - 1) \cdot RP_i)$$

$$C' = C \cdot (1 + \sum(COFF_i - 1) \cdot CP_i)$$ [Equation 6]

In operation S76, an operation of calculating a delay of the first net may be performed. The delay of the first net may be calculated based on the corner resistance and the corner capacitance of the first net by using an RC delay. In some embodiments, the delay of the first net may be calculated based on the corner resistance R and the corner capacitance C of the first net. In some embodiments, the delay of the first net may be calculated based on the corner resistance R1' and the corner capacitance C' of the first net, adjusted based on a process shift. Delays of interconnections like the first net and delays of gates including a pin connected to the interconnections may be calculated, and thus, a timing report 900 may be generated by operation S70'.

Figure 14:
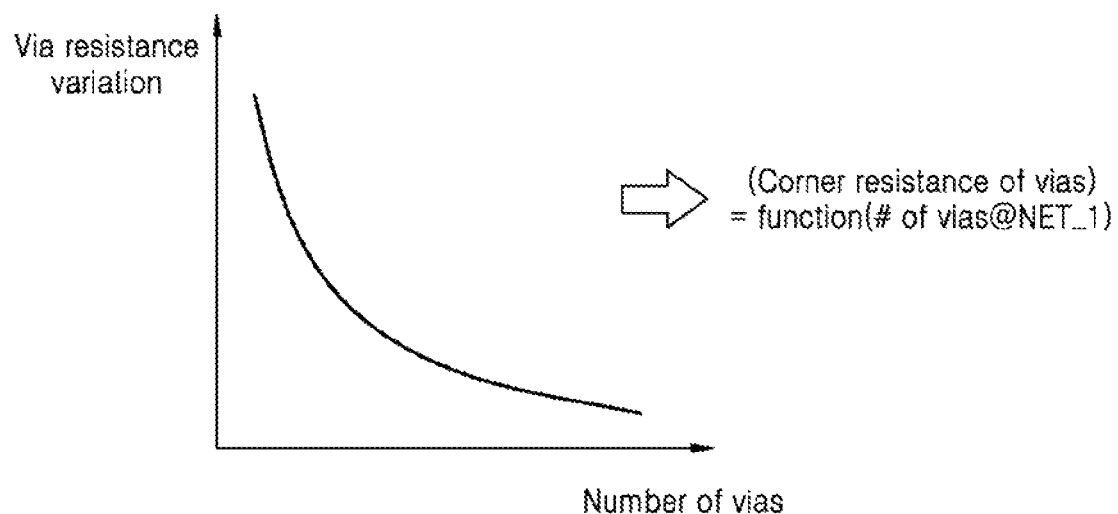
FIG. 14 is a graph showing a relation between the number of vias formed in a layout of an integrated circuit and the variation of via resistance according to an exemplary embodiment of the inventive concept.

FIG. 14 is a graph showing a relation between the number of vias formed in a layout of an integrated circuit and the variation of via resistance according to an exemplary embodiment of the inventive concept.

Referring to FIG. 14, the graph shows that as the number of vias increases, the variation of via resistance decreases. In other words, vias may have a weak correlation with each other. Accordingly, as described below with reference to FIG. 15, applying variations in the same direction to all vias included in one net or applying a variation having the same size in the same direction to all the vias may cause a pessimistic or optimistic analysis. The method according to an exemplary embodiment of the inventive concept may avoid a pessimistic or optimistic analysis by defining a corner resistance of a via as a function of the number of vias included in a net, as illustrated on a right side of FIG. 14.

Figure 15:
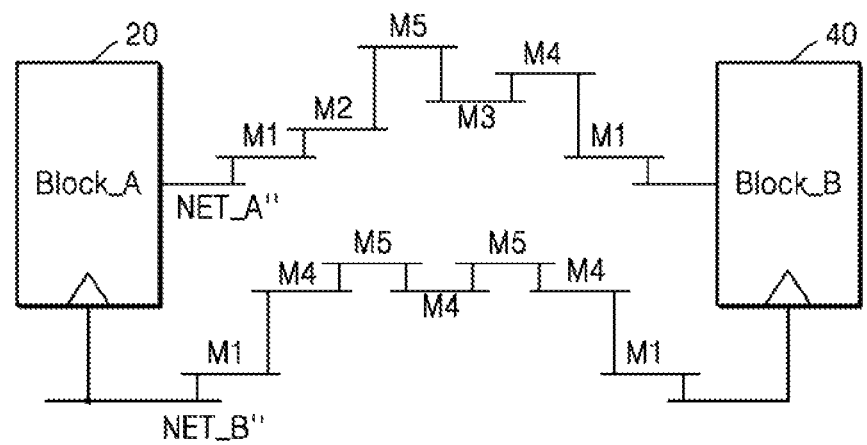
FIG. 15 is a diagram illustrating an analysis result when variations in the same direction are applied to resistances of vias as conducting segments when analyzing a corner case, according to an exemplary embodiment of the inventive concept.

FIG. 15 is a diagram illustrating a pessimistic or optimistic analysis result when variations in the same direction are applied to resistances of vias as conducting segments when analyzing a corner case, according to an exemplary embodiment of the inventive concept.

Referring to FIG. 15, similar to FIGS. 5A and 5B, an integrated circuit may include two blocks 20 and 40, a net NET_A" may provide a data path, and a net NET_B" may provide a clock path. As illustrated in FIG. 15, each of the net NET_A" and the net NET_B" may include a plurality of vias in a layout of the integrated circuit.

When variation in a direction decreasing a delay time of a signal is applied to resistances of vias, for example, when resistances of vias increase from a nominal value to a value greater than the nominal value, a delay time of a data path may be calculated to be relatively long. As a result, a margin of a setup time may be estimated to be relatively small. This can give a pessimistic result. When a variation in a direction increasing a delay time of a signal is applied to resistances of vias, for example, when resistances of vias increase from a nominal value to a value greater than the nominal value, a delay time of a data path may be calculated to be relatively long. As a result, a margin of a hold time may be estimated to be excessively large. This can give an optimistic result. Accordingly, an integrated circuit may be designed which has a margin lower or higher than desired. Thus, a failure rate of a manufactured integrated circuit may increase, or excessive overhead may be applied during the design stage.

Figure 16:
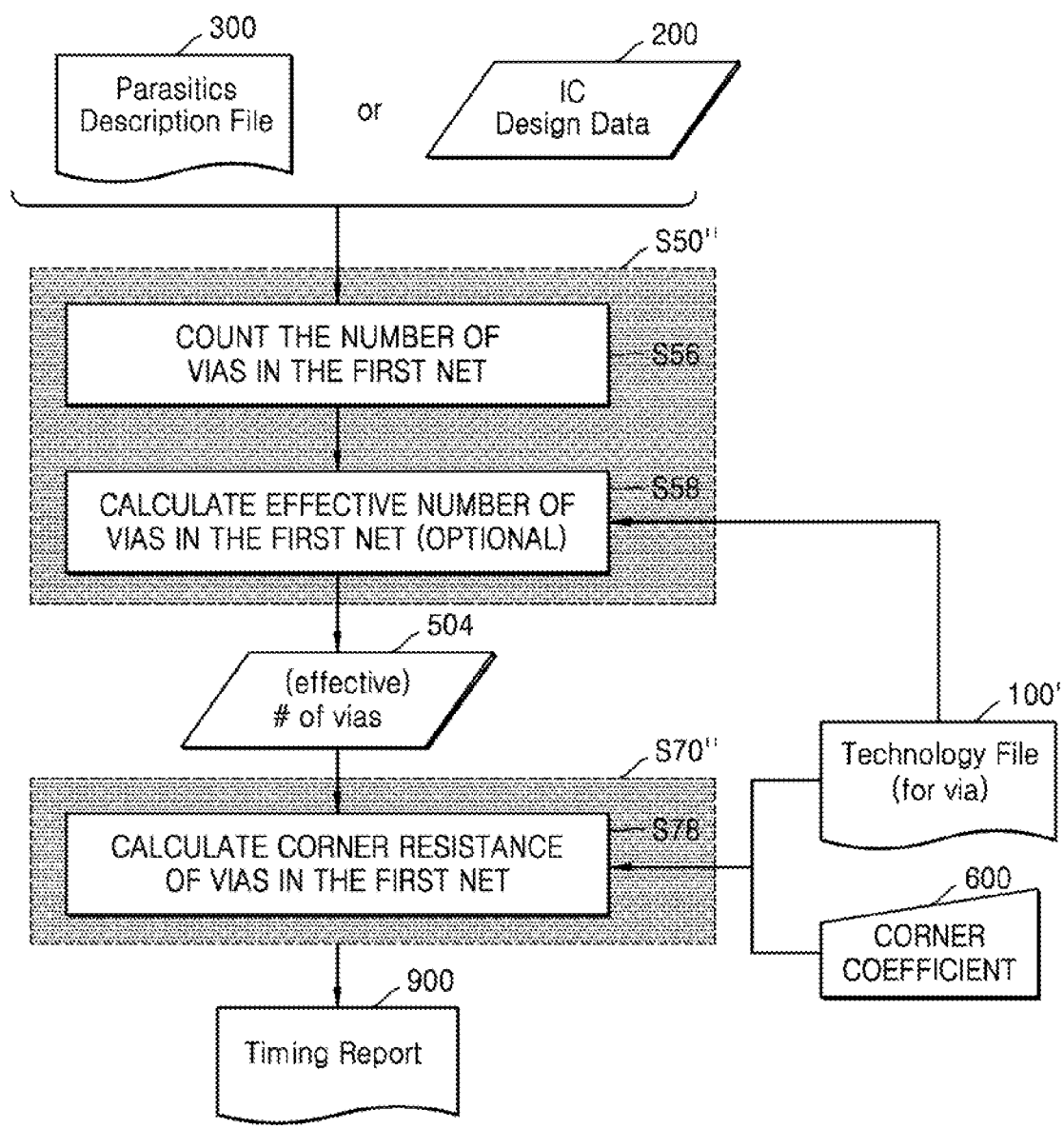
FIG. 16 is a flowchart illustrating operation S50 of FIG. 9 and operation S70 of FIG. 12, according to an exemplary embodiment of the inventive concept.
Figures 17, 18:
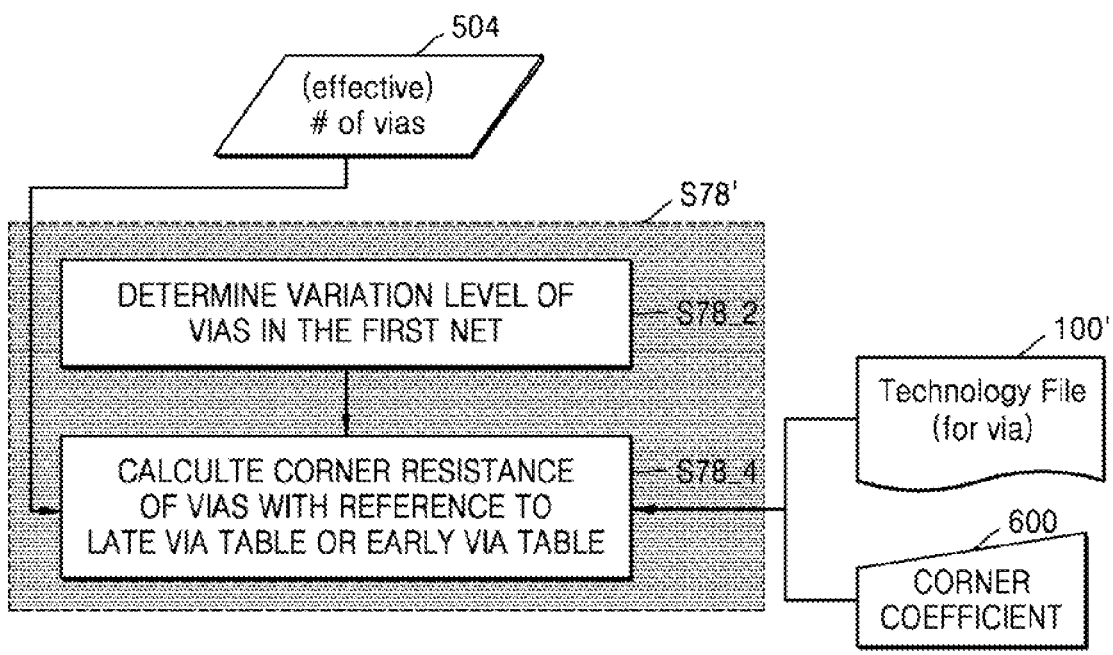
FIG. 17 is a diagram illustrating a technology file that is used in the example of FIG. 16 according to an exemplary embodiment of the inventive concept.
FIG. 18 is a flowchart illustrating operation S78 of FIG. 16, according to an exemplary embodiment of the inventive concept.

FIG. 16 is a flowchart illustrating operation S50" corresponding to operation S50 of FIG. 9 and operation S70" corresponding to operation S70 of FIG. 12, according to an exemplary embodiment of the inventive concept. FIG. 17 is a diagram illustrating an example of a technology file 100' that is used in FIG. 16 according to an exemplary embodiment of the inventive concept. For example, FIG. 16 illustrates a method of analyzing a timing of an integrated circuit based on the number of vias. As illustrated in FIG. 16, operation S50" may include operation S56 and operation S58, and operation S70" may include operation S78.

Referring to FIG. 16, a parasitics description file 300 or design data 200 of the integrated circuit may be provided. According to an exemplary embodiment of the inventive concept, the number of vias of a first net may be counted from the parasitics description file 300. For example, referring to FIG. 7, in the parasitic description file 300, resistors having equal resistances regardless of a sigma level may denote resistors of vias. In other words, when values of Z, Z', and Z", which are resistances of R2, in the parasitics description file 300, are equal to each other, R2 may correspond to a resistance of a via. This may be because a technology file 100 includes a constant resistance of a via, as illustrated in FIG. 7. Accordingly, in operation S56, the number of vias included in the first net may be counted by counting resistors having equal resistances regardless of a sigma level in the first net.

According to an exemplary embodiment of the inventive concept, the number of vias of the first net may be counted from the design data 200 of the integrated circuit. The design data 200 of the integrated circuit may include topological data of the integrated circuit, and in operation S56, the number of vias included in the first net may be counted from the topological data.

As illustrated in FIG. 11, when a net includes a plurality of paths, the number of vias of the net may be a function of the number of vias included in each of the plurality of paths. Similar to the case of metal layers, as the number of vias increases, a difference between a corner resistance and a nominal resistance of the vias decreases. Thus, the number of vias of the net may be the number of vias of the path that has the least vias, from among the plurality of paths to conservatively perform a timing analysis of the net.

In operation S58, an operation of calculating an effective number of vias in the first net may be performed. The operation of calculating an effective number of vias may be selectively performed. Each of the vias of the first net may have a weight according to a level, i.e., a via layer, in which the particular via has been disposed, and a weighted sum to which the weight has been applied may be calculated as an effective number of vias. For example, referring to FIGS. 4 and 17, the number of vias formed in a first via layer V1 that electrically connects a first metal layer M1 to an active region of an active transistor may be a criterion (for example, W(V1) that is a weight of the first via layer V1 may be set to 1), and a second via layer V2 that electrically connects the first metal layer M1 to a second metal layer M2 may have a weight that is higher than that of the first via layer V1 (for example, W(V2) that is a weight of the second via layer V2 may be set to 1.2). In other words, weights shown in FIG. 17 may mean that the second via layer V2 is more sensitive to a process variation than the first via layer V1. Accordingly, when the number of vias formed in the first via layer V1 is 2 and the number of vias formed in the second via layer V2 is 3, an effective number of vias may be calculated as 5.6(2×1+3×1.2).

Data 504 including the number of vias of the first net or an effective number of vias of the first net may be generated by operation S50". The data 504 may be used for generating a timing report 900 in operation S70".

In operation S78, an operation of calculating corner resistances of vias of the first net may be performed based on the data 504 including the number of vias, the technology file 100', and a corner efficient 600. The technology file 100' may store variations of resistances of vias which correspond to the number of vias. For example, corner resistances of vias of the first net may be calculated by using the following Equation 7.

(corner resistance of vias)=(nominal resistance of vias)×CORNER_COEFFICIENT×(1±via_variation(number of vias))      [Equation 7]

Referring to FIG. 17, the technology file 100' may include a late via table (e.g., a second via table) and an early via table, (e.g., a first via table), and each of the late via table and the early via table may be selectively referred to, based on a corner case to be analyzed. An example of how to calculate the corner resistances of vias with reference to the late via table and the early via table will be described in detail with reference to FIG. 18 below.

In operation S70", a delay time of a signal generated by the first net may be calculated based on corner resistances of vias calculated by operation S78, and thus, a timing report 900 of an integrated circuit may be generated.

In the example of FIGS. 16 and 17, although corner resistances of vias have been calculated based on a table included in the technology file 100', the inventive concept is not limited thereto, and other methods that use properties in which as the number of vias increases, variations of resistances of the vias decrease may also be used. For example, according to an exemplary embodiment of the inventive concept, in operation S70" of FIG. 16, a variation of a net may be directly calculated by using a nominal value of vias and a standard deviation a instead of referring to a function or table having the number of vias as an argument. When a path to be analyzed includes n vias (for example, via 1, via 2, . . . , and via n), a corner resistance of any via (for example, via k, where k is an integer between 1 and n, inclusive of 1 and n) of the vias via 1 to via n on the path may be calculated by using the following Equation 8. In Equation 8, a (via k) denotes a standard deviation of the via k. Equation 8 is similar to Equation 7, but is different from Equation 7 as follows. While, in Equation 7, a statistical effective value is calculated in advance and the calculated statistical effective value is stored in a table for the number of vias to use it, a method of Equation 8 directly calculates the statistical effective value.

$$(\text{corner resistance of via } k) = \\ (\text{nominal resistance of via } k) \pm \\ \text{CORNER\_COEFFICIENT} \frac{\sigma(\text{via } k)^2}{\sqrt{\sum_{i=1}^{n} \sigma(\text{via } i)^2}}$$ [Equation 8]

FIG. 18 is a flowchart illustrating operation S78' corresponding to operation S78 of FIG. 16, according to an exemplary embodiment of the inventive concept. As described above with reference to FIG. 16, an operation of calculating corner resistances of vias of the first net based on the data 504 including the number of vias, the technology file 100', and the corner coefficient 600 may be performed in operation S78. Referring to FIG. 18, operation S78' may include operation S78_2 and operation S78_4.

In operation S78_2, an operation of determining variation levels of vias in a first net may be performed. In other words, it may be determined which one of late and early via tables the vias in the first net will refer to, based on the type of a signal that moves through the first net. For example, referring to FIG. 15, when analyzing a setup time, it may be determined that vias included in the net NET_A" refer to the late via table so that the net NET_A" corresponding to a data path corresponds to a relatively long delay time. In addition, it may be determined that vias included in the net NET_B" refer to the early via table so that the net NET_B" corresponding to the clock path corresponds to a relatively short delay time. In addition, when analyzing a hold time, it may be determined that vias included in the net NET_A" refer to the early via table so that the net NET_A" corresponding to the data path corresponds to a relatively short delay time and it may be determined that vias included in the net NET_B" refer to the late via table so that the net NET_B" corresponding to the clock path corresponds to a relatively long delay time.

In operation S78_4, an operation of calculating corner resistances of vias with reference to the late via table or the early via table may be performed. Based on a result determined in operation S78_2, a table (e.g., the late via table or the early via table) that is to be used to calculate resistances of vias in the first net may be determined, and the resistance of the vias may be calculated based on the determined table.

Figure 19:
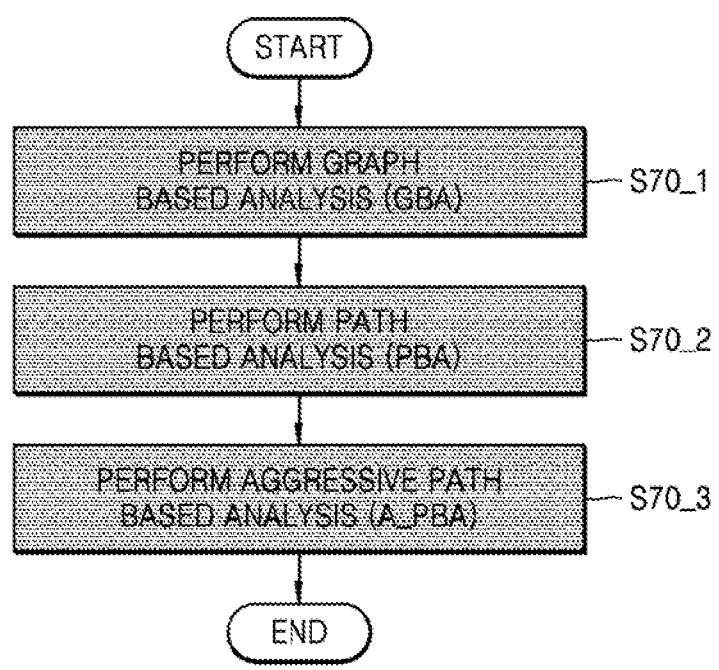
FIG. 19 is a flowchart illustrating operation S70 of FIG. 12, according to an exemplary embodiment of the inventive concept.

FIG. 19 is a flowchart illustrating operation S70 of FIG. 12, according to an exemplary embodiment of the inventive concept. As described above with reference to FIG. 12, operation S70 of FIG. 12 may include calculating a delay time of a signal that is generated by a net using an RC delay, and the timing report 900 of an integrated circuit may be generated based on the calculated delay time. Referring to FIG. 19, operation S70 of FIG. 12 may include three operations S70_1 to S70_3.

In operation S70_1, a graph-based analysis (GBA) may be performed. The GBA provides an analysis result having a relatively low accuracy, but may reduce a time that is required to analyze a timing of an integrated circuit. For example, the GBA may analyze an output signal of a gate, based on a signal having the most pessimistic slew from among signals that are applied to a plurality of inputs of the gate.

In operation S70_2, the PBA may be performed. The PBA may need a long time to analyze a timing of an integrated circuit, but may provide an analysis result having a relatively high accuracy. For example, the PBA may analyze an output signal of a gate, based on a signal influencing on the output signal of the gate from among signals that are applied to a plurality of inputs of the gate. Since a time that is required for the PBA is relatively long, the PBA in operation S70_2 may be performed on a part that needs to be analyzed in greater detail based on the analysis result of the GBA performed in operation S70_1.

In operation S70_3, an aggressive PBA may be performed. The aggressive PBA may analyze related all paths with respect to a part that needs to be analyzed in greater detail based on the analysis result of the PBA performed in operation S70_2, and may analyze a timing based on physical characteristics of each of the paths.

A method according to an exemplary embodiment of the inventive concept may provide various options corresponding to various levels to analyze a timing of an integrated circuit. In other words, the method may provide different parameters that support the GBA, PBA, and the aggressive PBA. This operation will be described below with reference to FIG. 20.

Figure 20:
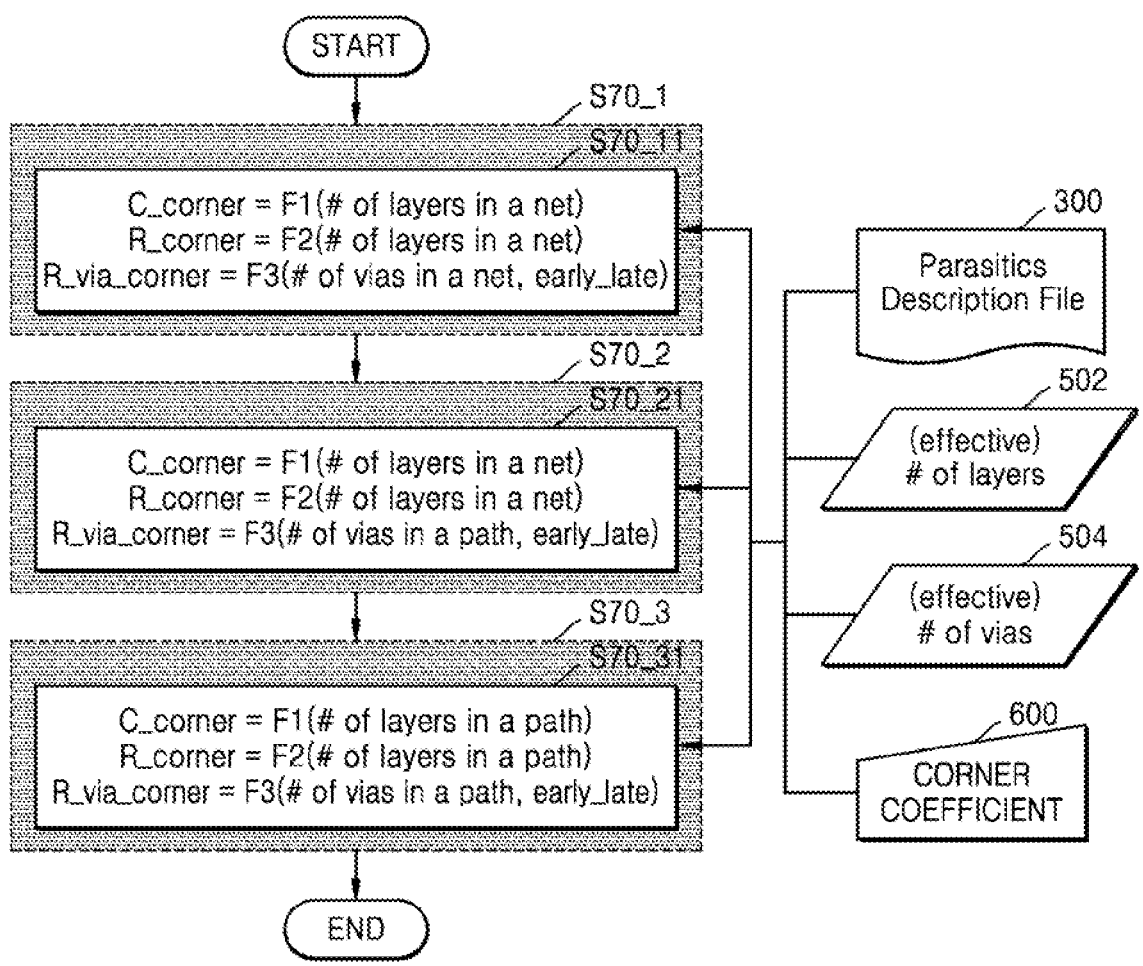
FIG. 20 is a flowchart illustrating a timing analysis operation of FIG. 19, according to an exemplary embodiment of the inventive concept.

FIG. 20 is a flowchart illustrating a timing analysis operation of FIG. 19, according to an exemplary embodiment of the inventive concept. As described above with reference to FIG. 19, with respect to a timing analysis, the GBA may be performed in the operation S70_1, the PBA may be performed in the operation S70_2, and the aggressive PBA may be performed in operation S70_3. As illustrated in FIG. 20, an analysis operation of each of operations S70_1 to S70_3 may be performed based on a parasitics description file 300, data 502 including the number of layers, data 504 including the number of vias, and data 600 including a corner coefficient.

In operation S70_11 included in operation S70_1, a corner resistance and a corner capacitance of a net may be calculated based on the number of layers of the net and the number of vias of the net. For example, referring to FIG. 11, the number of layers of the first net NET_1' may be the number of layers of the path that has the least number of layers from among the numbers of layers included in the plurality of paths to conservatively perform a timing analysis of the net. For example, referring to FIG. 11, the number of layers of the first net NET_1' may be a minimum value of the number of layers of the three paths P1 to P3, respectively. A corner resistance and a corner capacitance of a pattern formed in a layer may be calculated based on the number of layers of the first net NET_1'. In addition, the number of vias of the first net NET_1' may be the number of vias of the path that has the least vias, from among the three paths P1 to P3. A corner resistance of the vias may be calculated by referring to an early via table or a late via table based on the number of vias of the first net NET_1'. In the example of FIG. 20, whether to refer to the early via table or the late via table may be determined by an "early_late" argument, and the early via table or the late via table may be selectively chosen according to an item (e.g., a setup time or a hold time) to be analyzed, as described above with reference to FIG. 17.

In operation S70_21 included in operation S70_2, a corner resistance and a corner capacitance of a path may be calculated based on the number of layers of the net and the number of vias of the net. For example, referring to FIG. 11, a corner resistance and a corner capacitance of a pattern formed in a layer may be calculated based on the number of layers of the first net NET_1', and a corner resistance of vias of each of the paths P1 to P3 may be calculated based on the number of vias of each of the paths P1 to P3.

In operation S70_31 included in operation S70_3, a corner resistance and a corner capacitance of a path may be calculated based on the number of layers of the net and the number of vias of the net. For example, referring to FIG. 11, a corner resistance and a corner capacitance of a pattern formed in a layer may be calculated based on the number of layers of each of the paths P1 to P3, and a corner resistance of vias of each of the paths P1 to P3 may be calculated based on the number of vias of each of the paths P1 to P3.

Figure 21:
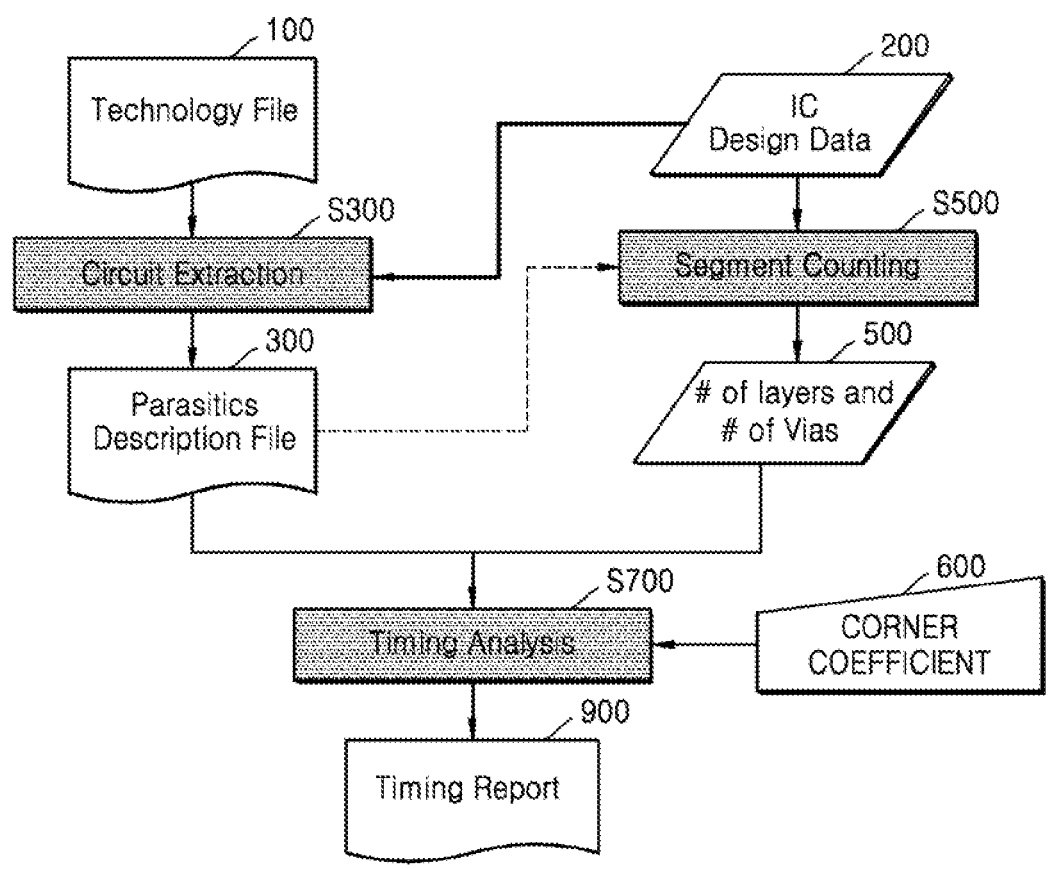
FIG. 21 is a flowchart illustrating analyzing a timing of an integrated circuit, according to an exemplary embodiment of the inventive concept.

FIG. 21 is a flowchart illustrating a method of analyzing an integrated circuit, according to an exemplary embodiment of the inventive concept. For example, FIG. 21, which corresponds to an example of the method illustrated in FIG. 1, illustrates a flowchart showing in detail a process of inputting data, outputting data, and processing data.

Referring to FIG. 21, a technology file 100 and a design data 200 of an integrated circuit may be provided. As described above, the technology file 100 may include information about a process of manufacturing a semiconductor device including an integrated circuit, for example, a unit resistance and a unit capacitance of a metal layer, and a resistance of a via, and a standard deviation for distribution of resistances and capacitances. The design data 200 of the integrated circuit may include information about the integrated circuit, for example, a netlist of the integrated circuit and topological data related to a layout of the integrated circuit.

A circuit extraction operation may be performed in operation S300, and thus, a parasitics description file 300 may be generated. As described above with reference to FIG. 7, the parasitic description file 300 may include a plurality of resistances and a plurality of capacitances, which correspond to conducting segments forming a net of an integrated circuit, and the plurality of resistances and the plurality of capacitances may correspond to sigma levels.

In operation S500, an operation of counting conducting segments may be performed, and thus, the data 500 including the number of layers and the number of vias may be generated. As described above with reference to FIG. 10, the number of layers may be a counted number, i.e., the number of patterns formed in different layers, and an effective number of layers may be calculated from the number of patterns formed in the layers. In addition, as described above with reference to FIG. 16, the number of vias may be the number of vias included in a net or may be an effective number of vias which is a weighted sum to which a weight has been applied based on a via layer in which vias has been formed.

In operation S700, an operation of analyzing a timing of the integrated circuit may be performed, and thus, a timing report 900 of the integrated circuit may be generated. For example, the timing analysis in operation S700 may be a static timing analysis (STA), and may calculate a delay time of a signal generated in a net, based on the parasitics description file 300, the data 500 including the number of layers and the number of vias, and data 600 including a corner coefficient set in advance by a designer or set by default. For example, the designer may manually set the corner coefficient. As described above with reference to FIG. 19, a GBA, a PBA, and an aggressive PBA may be sequentially performed in operation S700.

Operations S300, S500, and S700 illustrated in FIG. 21 may be performed in separate modules, respectively, or may be performed in a single module. The module may be a unit performing a specific function or may correspond to a software or hardware element (e.g., a field programmable gate array (FPGA) or an application specific integrated circuit (ASIC)). However, the module is not limited to a software or hardware element and may correspond to an element obtained by a combination of software and hardware.

Figure 22:
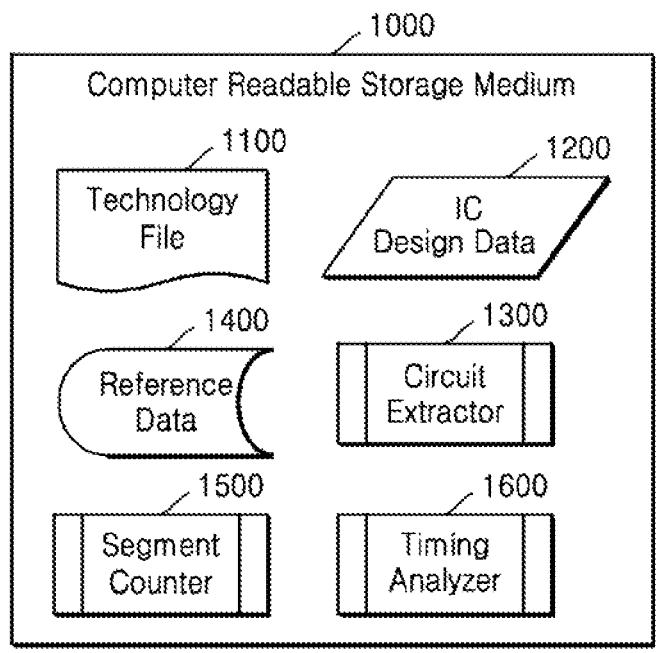
FIG. 22 is a block diagram of a computer-readable storage medium according to an exemplary embodiment of the inventive concept.

According to an exemplary embodiment of the inventive concept, when a module that performs each of operations S300, S500, and S700 is a software element as shown in FIG. 22, the module may be contained in a storage medium that may be accessed by a processor, and may be configured to be executed in at least one processor. For example, the module may be an object-oriented software element, a class element, or a task element. Also, the module may include processes, functions, attributes, procedures, subroutines, segments of program code, drivers, microcode, data structures, tables, arrays, and variables.

FIG. 22 is a block diagram illustrating a computer-readable storage medium 1000 according to an exemplary embodiment of the inventive concept. Referring to FIG. 22, the computer-readable storage medium 1000 may include a technology file 1100, design data 1200 of an integrated circuit, a circuit extractor 1300, reference data 1400, a segment counter 1500, and a timing analyzer 1600.

The computer-readable storage medium 1000 may include a storage medium that may be read by a computer while the storage medium is used for providing instructions and/or data to the computer. For example, the computer-readable storage medium 1000 may include a magnetic or optical medium, such as a disk, a tape, compact disc read only memory (CD-ROM), digital versatile disc (DVD)-ROM, compact disc recordable (CD-R), compact disc rewritable (CD-RW), DVD-R, or DVD-RW, a volatile or non-volatile memory, such as random access memory (RAM), read-only memory (ROM), or a flash memory, a non-volatile memory that is accessible via an USB interface, and/or microelectromechanical systems (MEMS). The computer-readable storage medium 1000 may be inserted in a computer, be integrated in a computer, or be combined with a computer via communication media, such as a network and/or a wireless link.

The technology file 1100 may include information about a process of manufacturing a semiconductor device including an integrated circuit, and the design data 1200 of the integrated circuit may include information about a netlist or layout of the integrated circuit. In the example of FIG. 22, although the technology file 1100 and the design data 1200 of the integrated circuit are stored in the computer-readable storage medium 1000 along with other elements, the technology file 1100 and the design data 1200 of the integrated circuit may be stored in another storage medium that is separate from the computer-readable storage medium 1000, and the storage medium and the computer-readable storage medium 1000 may be separately accessed by a computing system or a processor included in a computing system.

The circuit extractor 1300 may include a plurality of instructions for performing an operation of generating a parasitics description file according to one or more exemplary embodiments of the inventive concept, based on the technology file 1100 and the design data 1200 of the integrated circuit.

The segment counter 1500 may include a plurality of instructions for performing an operation of generating data including the number of conducting segments according to one or more exemplary embodiments of the inventive concept, based on the design data 1200 of the integrated circuit and/or a parasitics description file generated by the circuit extractor 1300. The number of conducting segments may be a value obtained by counting the conducting segments of the integrated circuit or may be a value calculated from the value obtained by the counting.

The timing analyzer 1600 may include a plurality of instructions for performing an operation of generating a timing report of the integrated circuit according to one or more exemplary embodiments of the inventive concept, based on a parasitics description file generated by the circuit extractor 1300, data including the number of conducting segments, generated by the segment counter 1500, and a corner coefficient set by a designer or set by default. For example, the timing analyzer 1600 may calculate an effective corner coefficient from the corner coefficient based on the number of conducting segments, and may calculate a corner resistance and a corner capacitance by selecting one of a plurality of resistances and capacitances included in the parasitics description file or by interpolating at least two of the plurality of resistances and capacitances included in the parasitics description file, based on the effective corner coefficient. The timing analyzer 1600 may calculate a delay time of a signal generated by a net (or interconnection), based on the calculated corner resistance and corner capacitance.

The reference data 1400 may include data that is referred to when the circuit extractor 1300, the segment counter 1500, and the timing analyzer 1700 each perform an operation. For example, the reference data 1400 may include a standard cell library including topological data and timing information of standard cells, and the standard cell library may be referred to by the circuit extractor 1300, the segment counter 1500, or the timing analyzer 1700.

In the example of FIG. 22, although the circuit extractor 1300, the segment counter 1500, and the timing analyzer 1600 are separately stored in the storage medium 1000, the inventive concept is not limited thereto and at least two selected from the circuit extractor 1300, the segment counter 1500, and the timing analyzer 1600 may be combined. For example, according to an exemplary embodiment of the inventive concept, the segment counter 1500 may be included in the circuit extractor 1300. Alternatively, the circuit extractor 1300 and the segment counter 1500 may be included in the timing analyzer 1600.

Figure 23:
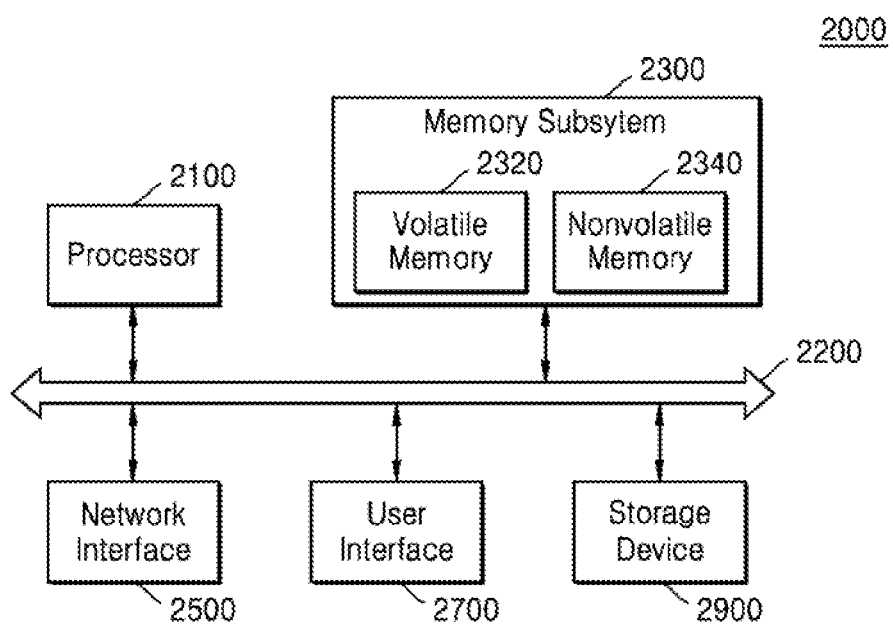
FIG. 23 is a block diagram of a computing system according to an exemplary embodiment of the inventive concept.

FIG. 23 is a block diagram illustrating a computing system 2000 according to an exemplary embodiment of the inventive concept. As illustrated in FIG. 23, the computing system 2000 may include a processor 2100, a memory subsystem 2300, a network interface 2500, a user interface 2700, and a storage device 2900, which may communicate with each other via a bus 2200.

The processor 2100 may be configured to execute instructions for performing at least one of the methods according to the exemplary embodiments described above. For example, the processor 2100 may execute a plurality of instructions for a circuit extraction operation, an operation of counting conducting segments, and an operation of analyzing timing. In other words, some or all of operations included in the flowcharts according to the exemplary embodiments of the inventive concept described above may be performed by the processor 2100. According to an exemplary embodiment of the inventive concept, the processor 2100 may execute a instruction set (e.g., a instruction set for Intel Architecture-32 (IA-32), 64-bit extended IA-32, x86-64, performance optimization with enhanced RISC—performance computing (PowerPC), scalable processor architecture (Sparc), million instructions per second (MIPS), advanced RISC machine (ARM), or IA-64). The computing system 2000 may include one or more processors.

The memory subsystem 2300 may include a volatile memory 2320 and a non-volatile memory 2340. The volatile memory 2320 and the non-volatile memory 2340 may each include any type of memory device. For example, the volatile memory 2320 may include dynamic random access memory (DRAM), static random access memory (SRAM), mobile DRAM, double data rate synchronous dynamic random access memory (DDR SDRAM), low power DDR (LPDDR) SDRAM, graphic DDR (GDDR) SDRAM, or Rambus dynamic random access memory (RDRAM). The non-volatile memory 2340 may include electrically erasable programmable read-only memory (EEPROM), a flash memory, phase change random access memory (PRAM), resistance random access memory (RRAM), nano floating gate memory (NFGM), polymer random access memory (PoRAM), magnetic random access memory (MRAM), or ferroelectric random access memory (FRAM). Although not illustrated in FIG. 23, a memory controller may be included in the computing system 2000 to provide an interface of the memory subsystem 2300, and/or the processor 2100 may include the memory controller.

The memory subsystem 2300 may store instructions, which are used for performing at least a part of the above-described method of analyzing a timing of an integrated circuit, and/or data that is processed by the processor 2100. For example, the non-volatile memory 2340 may store a plurality of instructions that instruct the processor 2100 to perform an circuit extraction operation, an operation of counting conducting segments, and an operation of analyzing a timing, and the volatile memory 2320 may store some of data generated while the operations are performed, for example, a parasitic description file, the number of layers, the number of vias, and a timing report. Accordingly, the processor 2100 may perform methods according to exemplary embodiments.

The network interface 2500 may provide an interface for an external interface. For example, the external interface may include a plurality of interconnected computing systems and communication links, and the communication links may include wired links, optical links, wireless links, or any other types of links.

The user interface 2700 may provide an interface for a user. The user interface 2700 may include an input device, such as a keyboard or a pointing device, and may include an output device, such as a display device or a printer. For example, a user may set a corner coefficient or check a timing report, via the user interface 2700.

The storage device 2900 may include a storage medium that is detachable from the computing system 2000. For example, the storage device 2900 may include the computer-readable storage medium 1000 as illustrated in FIG. 22. When the computing system 2000 operates, some of data stored in the storage device 2900, for example, design data of an integrated circuit, may be transmitted to the memory subsystem 2300 via the bus 2200. In addition, data stored in the memory subsystem 2300, for example, a timing report, may move to the storage device 2900 under the control of the processor 2100, and the storage device 2900 may store received data.

While the inventive concept has been particularly shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A computer implemented method for analyzing a timing of an integrated circuit,
    wherein an interconnection of a first net of the integrated circuit comprises at least one conducting segment formed in a wiring layer or a via layer,
    the method comprising:
    obtaining a technology file and design data of the integrated circuit;
    extracting a plurality of resistances and a plurality of capacitances, which correspond to each of the at least one conducting segment, from the technology file and the design data, based on a process variation;
    counting a number of layers in which the at least one conducting segments is formed;
    calculating a corner resistance and a corner capacitance of the first net, based on the number of layers, the plurality of resistances, and the plurality of capacitances; and
    manufacturing a semi-conductor device including the integrated circuit based on the corner resistance and the corner capacitance.
    wherein the counting of the number of layers comprises calculating an effective number of layers based on a resistance variability and/or a capacitance variability of each of the layers.

2. The method of claim 1, wherein the calculating of the effective number of layers comprises:
    calculating a resistance variability of a first layer based on a plurality of resistances of conducting segments formed in the first layer; and
    calculating an effective number of layers for calculation of the corner resistance, based on the resistance variability of the first layer.

3. The method of claim 2, further comprising obtaining a shift of a resistance of each of the layers based on a process shift,
    wherein the calculating of the resistance variability of the first layer comprises adjusting the resistance variability of the first layer based on the shift of the resistance.

4. The method of claim 1, wherein the calculating of the effective number of layers comprises:
    calculating a capacitance variability of a first layer based on a plurality of capacitances of conducting segments formed in the first layer; and
    calculating an effective number of layers for calculation of the corner capacitance, based on the capacitance variability of the first layer.

5. The method of claim 4, further comprising obtaining a shift of a capacitance of each of the layers based on a process shift,
    wherein the calculating of the capacitance variability of the first layer comprises adjusting the capacitance variability of the first layer based on the shift of the capacitance.

6. The method of claim 1, wherein each of the layers of the integrated circuit has a probability distribution of a unit resistance according to the process variation,
    wherein the obtaining of the plurality of resistances and the plurality of capacitances comprises obtaining the plurality of resistances corresponding to an average value of the probability distribution and at least one value that is separate from the average value by as much as a multiple of a standard deviation of the probability distribution.

7. The method of claim 6, wherein the calculating of the corner resistance and the corner capacitance of the first net comprises:
    calculating an effective corner coefficient based on a corner coefficient set in advance and the effective number of layers, the corner coefficient corresponding to a coefficient of a standard deviation of probability distribution according to the process variation; and calculating the corner resistance of the first net based on at least one of the plurality of resistances and the effective corner coefficient.

8. The method of claim 7, wherein as the effective number of layers increases, the effective corner coefficient decreases.

9. The method of claim 1, further comprising obtaining a shift of a resistance of each of the layers based on a process shift,
wherein the calculating of the corner resistance and the corner capacitance of the first net comprises adjusting the corner resistance of the first net based on the shift of the resistance.

10. The method of claim 9, wherein the adjusting of the corner resistance of the first net comprises:
calculating resistance portions of the layers with respect to a total resistance of the first net; and
adjusting the corner resistance of the first net based on the shift of the resistance and the resistance portions.

11. The method of claim 1, further comprising obtaining a shift of a capacitance of each of the layers based on a process shift,
wherein the calculating of the corner resistance and the corner capacitance of the first net comprises adjusting the corner capacitance of the first net based on the shift of the capacitance.

12. The method of claim 11, wherein the adjusting of the corner capacitance of the first net comprises:
calculating capacitance portions of the layers with respect to a total capacitance of the first net; and
adjusting the corner capacitance of the first net based on the shift of the capacitance and the capacitance portions.

13. The method of claim 1, wherein the first net is connected to one output pin and first and second input pins,
wherein the counting of the number of layers comprises:
counting a first value that is an effective number of layers corresponding to a first path from the output pin and to the first input pin;
counting a second value that is an effective number of layers corresponding to a second path from the output pin and to the second input pin; and
determining a smaller value of the first and second values as the number of layers corresponding to the first net.

14. The method of claim 13, wherein when a timing analysis of the integrated circuit is a path-based analysis, the calculating of the corner resistance and the corner capacitance of the first net comprises calculating a first corner resistance and a first corner capacitance of the first path based on the first value, and calculating a second corner resistance and a second corner capacitance of the second path based on the second value.

15. A computer implemented method for analyzing a timing of an integrated circuit,
wherein an interconnection of a first net of the integrated circuit comprises at least one conducting segment formed in a wiring layer or a via layer,
the method comprising:
obtaining a technology file and design data of the integrated circuit;
extracting a plurality of resistances and a plurality of capacitances, which correspond to the first net, from the technology file and the design data, based on a process variation;
counting a number of layers in which the at least one conducting segments is formed, based on the design data;
calculating a corner resistance and a corner capacitance of the first net, based on the number of layers, the plurality of resistances, and the plurality of capacitances;
calculating a delay time of the first net based on the corner resistance and the corner capacitance; and
manufacturing a semi-conductor device including the integrated circuit based on the delay time,
wherein the counting of the number of layers comprises calculating an effective number of layers based on a resistance variability and/or a capacitance variability of each of the layers.

16. The method of claim 15, wherein the calculating of the effective number of layers comprises:
calculating a resistance variability of a first layer based on a plurality of resistances of conducting segments formed in the first layer; and
calculating an effective number of layers for calculation of the corner resistance, based on the resistance variability of the first layer.

17. The method of claim 16, further comprising obtaining a shift of a resistance of each of the layers based on a process shift,
wherein the calculating of the resistance variability of the first layer comprises adjusting the resistance variability of the first layer based on the shift of the resistance.

18. The method of claim 15, further comprising obtaining a shift of a resistance of each of the layers based on a process shift,
wherein the calculating of the corner resistance and the corner capacitance of the first net comprises adjusting the corner resistance of the first net based on the shift of the resistance.

19. The method of claim 18, wherein the adjusting of the corner resistance of the first net comprises:
calculating resistance portions of the layers with respect to a total resistance of the first net; and
adjusting the corner resistance of the first net based on the shift of the resistance and the resistance portions.

20. The method of claim 15, further comprising obtaining a number of vias corresponding to the first net, based on the design data,
wherein the calculating of the corner resistance and the corner capacitance of the first net comprises calculating a corner resistance of the vias based on the number of vias.

* * * * *